US012645670B2

(12) United States Patent (10) Patent No.: US 12,645,670 B2
Anushiravani et al. (45) Date of Patent: Jun. 2, 2026

(54) MACHINE LEARNING TECHNIQUES FOR GENERATING DOMAIN-AWARE QUERY EXPANSIONS

(71) Applicant: Optum, Inc., Minnetonka, MN (US)

(72) Inventors: Ramin Anushiravani, San Carlos, CA (US); Micah David Ketola, Jersey City, NJ (US); Prerna Kaul, Minneapolis, MN (US); Cem Unsal, Alameda, CA (US); Chun-Chu Andrew Cheng, Artesia, CA (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/583,102

(22) Filed: Feb. 21, 2024

(65) Prior Publication Data

US 2025/0068624 A1 Feb. 27, 2025

Related U.S. Application Data

(60) Provisional application No. 63/578,459, filed on Aug. 24, 2023.

(51) Int. Cl.
*G06F 16/24* (2019.01)
*G06F 16/242* (2019.01)

(52) U.S. Cl.
CPC ................................ *G06F 16/2423* (2019.01)

(58) Field of Classification Search
None
See application file for complete search history.

(56) References Cited

U.S. PATENT DOCUMENTS

| | | | |
|---|---|---|---|
| 6,182,068 | B1 | 1/2001 | Culliss |
| 6,564,213 | B1 | 5/2003 | Ortega et al. |
| 6,738,754 | B1 | 5/2004 | Norman, Jr. |
| 7,548,910 | B1 | 6/2009 | Chu et al. |
| 7,657,522 | B1 | 2/2010 | Puzicha et al. |
| 7,933,859 | B1 | 4/2011 | Puzicha et al. |
| 8,100,829 | B2 | 1/2012 | Rothman et al. |
| 8,312,138 | B2 | 11/2012 | Hull et al. |

(Continued)

FOREIGN PATENT DOCUMENTS

| | | |
|---|---|---|
| CA | 2816517 A1 | 4/2012 |
| CA | 2836381 A1 | 11/2012 |

(Continued)

OTHER PUBLICATIONS

A Novel Combined Term Suggestion Service for Domain-Specific Digital Libraries, Hienert et al (Year: 2011).*

(Continued)

*Primary Examiner* — Augustine K. Obisesan
(74) *Attorney, Agent, or Firm* — Alston & Bird LLP

(57) ABSTRACT

Various embodiments of the present disclosure provide methods, apparatus, systems, computing devices, computing entities, and/or the like for generating domain-specific queries that are semantically similar to a search query by spell-correcting and tokenizing a search query, and then generating, using an embeddings dictionary data object associated with one or more domain vocabulary data objects, queries semantically related to the search query based on proximity of one or more similar embeddings to an embedding associated with the tokenized query within a domain vector space.

20 Claims, 10 Drawing Sheets

(56)          References Cited

U.S. PATENT DOCUMENTS

| | | | |
|---|---|---|---|
| 8,392,207 | B2 | 3/2013 | Olaniyan |
| 8,403,847 | B2 | 3/2013 | Rothman et al. |
| 8,583,450 | B2 | 11/2013 | Baker et al. |
| 8,620,842 | B1 | 12/2013 | Cormack |
| 8,706,530 | B2 | 4/2014 | Ohnemus et al. |
| 8,793,252 | B2 | 7/2014 | Subasic et al. |
| 8,972,397 | B2 | 3/2015 | Imig et al. |
| 8,996,314 | B2 | 3/2015 | Ohnemus et al. |
| 9,058,327 | B1 | 6/2015 | Lehrman et al. |
| 9,424,532 | B1 | 8/2016 | Abedini et al. |
| 9,436,760 | B1 | 9/2016 | Tacchi et al. |
| 9,460,214 | B2 | 10/2016 | Vuong et al. |
| 9,471,709 | B1 | 10/2016 | Zinenko et al. |
| 9,977,866 | B2 | 5/2018 | Norris et al. |
| 10,026,114 | B2 | 7/2018 | Tolvanen et al. |
| 10,062,039 | B1 | 8/2018 | Lockett |
| 10,176,541 | B2 | 1/2019 | Chaudhri et al. |
| 10,262,384 | B1 | 4/2019 | Albro et al. |
| 10,380,210 | B1 | 8/2019 | Lai et al. |
| 10,394,894 | B2 | 8/2019 | Garg et al. |
| 10,409,874 | B2 | 9/2019 | Cheng |
| 10,413,779 | B2 | 9/2019 | Ingram et al. |
| 10,438,291 | B1 | 10/2019 | Neben et al. |
| 10,489,440 | B2 | 11/2019 | Sharma et al. |
| 10,546,001 | B1 * | 1/2020 | Nguyen ............... G06F 40/186 |
| 10,770,184 | B1 | 9/2020 | Mcnair |
| 10,789,309 | B1 | 9/2020 | Bousquet et al. |
| 10,803,241 | B2 | 10/2020 | Weisman et al. |
| 10,943,072 | B1 | 3/2021 | Jaganmohan |
| 10,943,178 | B1 | 3/2021 | Gao et al. |
| 10,977,254 | B2 | 4/2021 | Claussenelias et al. |
| 11,004,135 | B1 | 5/2021 | Sandler et al. |
| 11,016,997 | B1 * | 5/2021 | Huang ................. G06F 16/285 |
| 11,055,324 | B1 | 7/2021 | Inoue et al. |
| 11,137,977 | B2 | 10/2021 | Weinstein et al. |
| 11,238,113 | B2 | 2/2022 | Freese et al. |
| 11,276,089 | B1 | 3/2022 | Salehie et al. |
| 11,308,538 | B1 | 4/2022 | Pineau |
| 11,366,966 | B1 | 6/2022 | Ramsey et al. |
| 11,416,535 | B2 | 8/2022 | Counts et al. |
| 11,527,326 | B2 | 12/2022 | Mcnair et al. |
| 11,636,949 | B2 | 4/2023 | Goldberg et al. |
| 11,748,413 | B1 | 9/2023 | Yoon et al. |
| 11,775,989 | B1 | 10/2023 | Hao et al. |
| 12,080,398 | B2 | 9/2024 | Nida et al. |
| 2002/0103680 | A1 | 8/2002 | Newman |
| 2003/0163349 | A1 | 8/2003 | Ho |
| 2004/0019601 | A1 | 1/2004 | Gates |
| 2004/0073538 | A1 | 4/2004 | Leishman et al. |
| 2005/0060194 | A1 | 3/2005 | Brown |
| 2005/0075931 | A1 | 4/2005 | Pearson |
| 2005/0080786 | A1 | 4/2005 | Fish et al. |
| 2005/0165627 | A1 | 7/2005 | Fotsch et al. |
| 2006/0031207 | A1 * | 2/2006 | Bjarnestam ........... G06F 40/284 |
| 2006/0206264 | A1 | 9/2006 | Rasmussen |
| 2008/0133272 | A1 | 6/2008 | Marshall |
| 2008/0313119 | A1 | 12/2008 | Leskovec et al. |
| 2009/0132573 | A1 | 5/2009 | Reed, Jr. et al. |
| 2009/0254402 | A1 | 10/2009 | Beall |
| 2009/0281719 | A1 | 11/2009 | Jakobson |
| 2009/0292555 | A1 | 11/2009 | Brown |
| 2010/0063846 | A1 | 3/2010 | Shakamuri |
| 2010/0076786 | A1 | 3/2010 | Dalton et al. |
| 2010/0131482 | A1 | 5/2010 | Linthicum et al. |
| 2010/0131498 | A1 | 5/2010 | Linthicum et al. |
| 2010/0179839 | A1 | 7/2010 | Collins et al. |
| 2011/0077973 | A1 | 3/2011 | Breitenstein et al. |
| 2011/0161110 | A1 | 6/2011 | Mault |
| 2011/0264513 | A1 | 10/2011 | Ratnaparkhi |
| 2012/0089413 | A1 | 4/2012 | Balassanian |
| 2012/0296455 | A1 | 11/2012 | Ohnemus et al. |
| 2013/0024474 | A1 | 1/2013 | Kraft et al. |
| 2013/0073686 | A1 | 3/2013 | Sandholm |
| 2013/0124492 | A1 * | 5/2013 | Gao ..................... G06F 40/232 |
| | | | 707/706 |

| | | | |
|---|---|---|---|
| 2013/0211858 | A1 | 8/2013 | Ohnemus et al. |
| 2013/0232006 | A1 | 9/2013 | Holcomb et al. |
| 2013/0290321 | A1 | 10/2013 | Shapira et al. |
| 2013/0325319 | A1 | 12/2013 | Moore et al. |
| 2014/0067423 | A1 | 3/2014 | Joao |
| 2014/0088986 | A1 | 3/2014 | Gowdy et al. |
| 2014/0100860 | A1 | 4/2014 | Stollmeyer et al. |
| 2014/0129493 | A1 | 5/2014 | Leopold |
| 2014/0156308 | A1 | 6/2014 | Ohnemus et al. |
| 2014/0280289 | A1 | 9/2014 | Marantz et al. |
| 2014/0310013 | A1 | 10/2014 | Ram et al. |
| 2014/0316811 | A1 | 10/2014 | Ohnemus et al. |
| 2014/0372133 | A1 | 12/2014 | Austrum et al. |
| 2014/0379755 | A1 * | 12/2014 | Kuriakose ......... G06F 16/24522 |
| | | | 707/780 |
| 2015/0234987 | A1 | 8/2015 | Laing et al. |
| 2015/0331878 | A1 | 11/2015 | Joseph et al. |
| 2016/0048646 | A1 | 2/2016 | Stover et al. |
| 2016/0078101 | A1 | 3/2016 | Somaiya et al. |
| 2016/0085799 | A1 | 3/2016 | Kim et al. |
| 2016/0092598 | A1 | 3/2016 | Mishra |
| 2016/0110826 | A1 | 4/2016 | Morimoto et al. |
| 2016/0140125 | A1 | 5/2016 | Goyal et al. |
| 2016/0188619 | A1 | 6/2016 | Su et al. |
| 2017/0097939 | A1 | 4/2017 | Zhu et al. |
| 2017/0109355 | A1 | 4/2017 | Li et al. |
| 2017/0123618 | A1 | 5/2017 | Porcella |
| 2017/0249713 | A1 | 8/2017 | Serbinis et al. |
| 2017/0270115 | A1 | 9/2017 | Cormack et al. |
| 2017/0293923 | A1 | 10/2017 | Margolis et al. |
| 2017/0308583 | A1 | 10/2017 | Husain et al. |
| 2018/0025334 | A1 | 1/2018 | Pourfallah et al. |
| 2018/0082030 | A1 | 3/2018 | Allen et al. |
| 2018/0165288 | A1 | 6/2018 | Chang et al. |
| 2018/0341875 | A1 | 11/2018 | Carr |
| 2019/0005409 | A1 | 1/2019 | Doshi et al. |
| 2019/0163679 | A1 | 5/2019 | Srinivasa et al. |
| 2019/0171728 | A1 | 6/2019 | Wakankar et al. |
| 2019/0188251 | A1 | 6/2019 | Liu et al. |
| 2019/0228038 | A1 | 7/2019 | Mishra |
| 2019/0325031 | A1 | 10/2019 | Puzicha |
| 2019/0325864 | A1 | 10/2019 | Anders et al. |
| 2019/0347323 | A1 | 11/2019 | Riesa et al. |
| 2019/0370393 | A1 * | 12/2019 | Finch ................. G06F 16/3338 |
| 2020/0005149 | A1 | 1/2020 | Ramanath et al. |
| 2020/0073953 | A1 | 3/2020 | Kulkarni |
| 2020/0092695 | A1 | 3/2020 | Vigeant et al. |
| 2020/0104395 | A1 | 4/2020 | Bhatia et al. |
| 2020/0279641 | A1 | 9/2020 | Nida et al. |
| 2020/0320139 | A1 | 10/2020 | Duishoev et al. |
| 2020/0342010 | A1 | 10/2020 | Rosomoff |
| 2020/0350072 | A1 | 11/2020 | Mcewing et al. |
| 2020/0365259 | A1 | 11/2020 | Chmait et al. |
| 2020/0388402 | A1 | 12/2020 | Frey et al. |
| 2020/0411146 | A1 | 12/2020 | Mcewing et al. |
| 2021/0019374 | A1 * | 1/2021 | Donaldson ............. G06N 3/045 |
| 2021/0027870 | A1 | 1/2021 | West |
| 2021/0090694 | A1 | 3/2021 | Colley et al. |
| 2021/0141860 | A1 | 5/2021 | Karagiannis et al. |
| 2021/0158144 | A1 | 5/2021 | Coulombe et al. |
| 2021/0174164 | A1 | 6/2021 | Hsieh et al. |
| 2021/0209095 | A1 | 7/2021 | Gallant |
| 2021/0241204 | A1 | 8/2021 | Stein |
| 2021/0295822 | A1 | 9/2021 | Tomkins et al. |
| 2021/0319520 | A1 | 10/2021 | Winters |
| 2021/0357187 | A1 | 11/2021 | Clement et al. |
| 2021/0398077 | A1 | 12/2021 | Lomurray et al. |
| 2022/0005566 | A1 | 1/2022 | Lyman et al. |
| 2022/0035867 | A1 | 2/2022 | Tambi et al. |
| 2022/0035869 | A1 | 2/2022 | Beck et al. |
| 2022/0067841 | A1 | 3/2022 | Hanson |
| 2022/0198573 | A1 | 6/2022 | Brown et al. |
| 2022/0245162 | A1 | 8/2022 | Wang et al. |
| 2022/0384052 | A1 | 12/2022 | Gnanasambandam et al. |
| 2022/0405476 | A1 | 12/2022 | Sar et al. |
| 2022/0405590 | A1 | 12/2022 | Hebets |
| 2023/0090023 | A1 * | 3/2023 | Gupta ............... G06F 16/90332 |
| | | | 707/732 |
| 2023/0138014 | A1 | 5/2023 | Sebastian |

(56) References Cited

U.S. PATENT DOCUMENTS

| 2023/0169139 A1 | 6/2023 | Baek et al. |
| 2023/0170092 A1 | 6/2023 | Moon et al. |
| 2023/0229706 A1 | 7/2023 | Zheng et al. |
| 2023/0252338 A1 | 8/2023 | Ayyadevara et al. |
| 2023/0283987 A1 | 9/2023 | Cheng et al. |
| 2023/0289524 A1 | 9/2023 | Prasad et al. |
| 2023/0359441 A1 | 11/2023 | Duan et al. |
| 2023/0394040 A1 | 12/2023 | Gupta et al. |
| 2023/0409614 A1 | 12/2023 | Hamilton et al. |
| 2024/0054326 A1 | 2/2024 | Dave et al. |
| 2024/0070693 A1 | 2/2024 | Neumann |
| 2024/0248900 A1* | 7/2024 | Sharma ............. G06F 16/24578 |
| 2024/0248901 A1 | 7/2024 | Krishnan et al. |
| 2024/0265431 A1 | 8/2024 | Jimnez et al. |
| 2024/0289361 A1 | 8/2024 | Batina et al. |
| 2024/0386330 A1 | 11/2024 | Ajmera et al. |
| 2024/0386454 A1 | 11/2024 | Bahnsen et al. |
| 2024/0428315 A1 | 12/2024 | Rao et al. |
| 2025/0166037 A1 | 5/2025 | Maschmeyer et al. |

FOREIGN PATENT DOCUMENTS

| CA | 2841006 A1 | 1/2013 |
| CN | 103329135 A | 9/2013 |
| CN | 107665217 A | 2/2018 |
| CN | 108304439 B | 7/2021 |
| EP | 2622568 A1 | 8/2013 |
| EP | 2710503 A1 | 3/2014 |
| EP | 2729912 A1 | 5/2014 |
| EP | 3156949 A2 | 4/2017 |
| IN | 201941028487 A | 1/2021 |
| WO | 2012/050969 A1 | 4/2012 |
| WO | 2012/156374 A1 | 11/2012 |
| WO | 2013/004706 A1 | 1/2013 |
| WO | 2014/087252 A2 | 6/2014 |
| WO | 2023/278037 A1 | 1/2023 |

OTHER PUBLICATIONS

The Effect of Using Domain Specific Ontologies in Query Expansion in Medical Field, Jalali et al (Year: 2008).*

A context-sensitive real-time Spell Checker with language adaptability, Prabhakar Gupta (Year: 2020).*

The Effect of Using Domain Specific Ontologies in Query Expansion in Medical Field, Soualmia et al (Year: 2011).*

"Semantic Textual Similarity," SBERT.net, (2 pages), (2024), [retrieved from the Internet Sep. 13, 2024] <URL: https://www.sbert.net/examples/training/sts/README.html>.

Ahmad, Wasi Uddin et al. "Context Attentive Document Ranking and Query Suggestion," In Proceedings of the 42nd International ACM SIGIR Conference on Research and Development in Information Retrieval, Jul. 21-25, 2019, pp. 385-394, DOI: 10.1145/3331184.3331246.

Alla, Samhita. "A Guide To Bidirectional RNNs With Keras," Paperspace Blog, (2020), (11 pages), (article, online), [retrieved from the Internet Sep. 13, 2024] <URL: https://blog.paperspace.com/bidirectional-rnn-keras/#:~:text=A%20Bidirectional%20RNN%20is%20a,the%20beginning%20of%20a%20sequence>.

Bao, et al., "Medical Code Prediction via Capsule Networks and ICD Knowledge", BMC Medical Informatics and Decision Making, vol. 21 (Suppl. 2):55, Jul. 30, 2021, (12 pages), doi.org/10.1186/s12911-021-01426-9.

Bern, Erik. "Spotify/Annoy: Approximate Nearest Neighbors In C++/Python Optimized For Memory Usage and Loading/Saving To Disk," GitHub, Apr. 10, 2023, (8 pages), [retrieved from the Internet Sep. 13, 2024] <URL: https://github.com/spotify/annoy>.

Briggs, James. "BERT For Next Sentence Prediction," Towards Data Science, May 25, 2021, (7 pages), (article, online) [retrieved from the Internet Sep. 13, 2024] <URL: https://towardsdatascience.com/bert-for-next-sentence-prediction-466b67f8226f>.

Chapelle, Olivier et al. "A Dynamic Bayesian Network Click Model For Web Search Ranking," In Proceedings of the 18th International Conference On World Wide Web, Apr. 20, 2009, pp. 1-10, Madrid, Spain, available online at https://citeseerx.ist.psu.edu/viewdoc/download?doi=10.1.1.180.337&rep=rep1&type=pdf.

Clinical Management Guidelines for Obstetrician-Gynecologists, The American College Of Obstetricians and Gynecologists Practice Bulletin, No. 109, Dec. 2009, pp. 1-12.

Coates, Dustin. "How NLP & NLU Work For Semantic Search," Search Engine Journal, Apr. 25, 2022, (15 pages), [retrieved from the Internet Sep. 11, 2024] <URL: https://www.searchenginejournal.com/nlp-nlu-semantic-search/444694/>.

Corrected Notice of Allowance and Fees Due (PTOL-85), Sep. 12, 2024, U.S. Appl. No. 18/484,943, (4 pages).

Dao, Tien Tuan et al. "Knowledge-Based Personalized Search Engine For The Web-Based Human Musculoskeletal System Resources (HMSR) In Biomechanics," Journal of Biomedical Informatics, vol. 46, pp. 160-173, Feb. 1, 2013, (ePub: Nov. 10, 2012), DOI: 10.1016/j.jbi.2012.11.001.

Doshi, Sanket. "Skip-Gram: NLP Context Words Prediction Algorithm," Towards Data Science, Mar. 16, 2019, (12 pages), (article, online), [retrieved from the Internet Sep. 13, 2024] <URL: https://towardsdatascience.com/skip-gram-nlp-context-words-prediction-algorithm-5bbf34f84e0c>.

Final Office Action for U.S. Appl. No. 17/934,688, dated Sep. 13, 2024, (20 pages), U.S. Patent and Trademark Office, US.

Galli, Keith. Galli K. "High-Performance Intent Classification In Sparse Supervised Data Conditions," Doctoral Dissertation, Massachusetts Institute of Technology, Jun. 2019, (62 pages), available online: https://dspace.mit.edu/bitstream/handle/1721.1/123200/1128822757-MIT.pdf?sequence=1&isAllowed=y.

Gupta, Jai et al. "Personalized Online Spell Correction For Personal Search," In Proceedings of the 2019 World Wide Web Conference (WWW'19), May 13-17, 2019, (7 pages), DOI: 10.1145/3308558.3313706.

Hwang, Sewoong et al. "Toward A Chatbot For Financial Sustainability," Sustainability, vol. 13, No. 6:3173, Mar. 13, 2021, pp. 1-18, DOI: 10.3390/su13063173.

International Search Report and Written Opinion for International Application No. PCT/US2023/015396, dated Jun. 19, 2023, (13 pages), European Patent Office, Rijswijk, Netherlands.

Lemoine, Julien, et al., "Predictive Search and Autocomplete", Algolia Blog, (14 pages), Dec. 6, 2022, Retrieved from the Internet https://web.archive.org/web/20221206165729/https://www.algolia.com/blog/ai/predictive-search-and-autocomplete/.

Li, Jianqiang et al. "Diversity-Aware Retrieval Of Medical Records," Computers In Industry, vol. 29, pp. 81-91, May 2015, DOI: http://dx.doi.org/10.1016/j.compind.2014.09.004.

McCreadie, Richard et al. "A Study of Personalised Medical Literature Search," In International Conference of the Cross-Language Evaluation Forum for European Languages, Sep. 15, 2014, pp. 74-85, Springer, Cham, DOI: 10.1007/978-3-319-11382-1_8.

Miller, Alissa S. et al. "Improving Stage Of Change In An Employee Wellness Program," Workplace Health & Safety, vol. 67, No. 8, pp. 381-290, Aug. 2019, DOI: 10. 1177/2165079919838291.

Momma, Michinari et al. "Multi-Objective Relevance Ranking," In Proceedings of the SIGIR 2019 eCom Workshop, Jul. 2019, (8 pages), Paris, France, DOI: https://assets.amazon.science/6f/7f/a34aac77415ead5d4d518d5b1801/multi-objective-relevance-ranking.pdf.

Non-Final Rejection Mailed on Feb. 26, 2024 for U.S. Appl. No. 17/971,491, 11 page(s).

Non-Final Rejection Mailed on Jun. 20, 2024 for U.S. Appl. No. 18/314,441, 15 page(s).

Non-Final Rejection Mailed on Mar. 13, 2024 for U.S. Appl. No. 17/934,688, 20 page(s).

NonFinal Office Action for U.S. Appl. No. 18/520,662, Sep. 10, 2024, (17 pages), U.S. Patent and Trademark Office, US.

Notice of Allowance and Fees Due (PTOL-85) Mailed on Aug. 7, 2024 for U.S. Appl. No. 17/971,491, 7 page(s).

Notice of Allowance and Fees Due (PTOL-85) Mailed on Aug. 23, 2024 for U.S. Appl. No. 18/484,943, 14 page(s).

(56) References Cited

OTHER PUBLICATIONS

Notice of Allowance and Fees Due (PTOL-85) Mailed on Aug. 28, 2024 for U.S. Appl. No. 17/971,491, 2 page(s).

Perrault, Evan K et al. "Employees' Refusals To Participate In An Employer-Sponsored Wellness Program: Barriers and Benefits To Engagement," Compensation & Benefits Review, vol. 52, No. 1, p. 8-18, Jan. 2020, DOI: 10.1177/0886368719899209.

Sun, Xu et al. "Feature-Frequency-Adaptive On-Line Training For Fast and Accurate Natural Language Processing," Computational Linguistic, vol. 40, No. 3, Sep. 1, 2014, pp. 563-586.

U.S. Provisional Patent Application, "Automated Health Data Acquisition, Processing And Communication System", Unpublished (filing date Nov. 30, 2012), (Peter Ohnemus, Inventor), 98 pages, U.S.A., U.S. Appl. No. 61/732,203.

U.S. Provisional Patent Application, "Health Data Acquisition, Processing and Communication System", Unpublished (filing date Jun. 9, 2011), (Peter Ohnemus, Inventor), 50 pages, U.S.A., U.S. Appl. No. 61/495,247.

U.S. Provisional Patent Application, "Health Data Acquisition, Processing and Communication System", Unpublished (filing date Sep. 29, 2010), (Peter Ohnemus, Inventor), 31 pages, U.S.A., U.S. Appl. No. 61/387,906.

U.S. Provisional Patent Application, "System And Method For Personal Energy Expenditure Analyses", Unpublished (filing date May 16, 2011), (Peter Ohnemus, Inventor), 35 pages, U.S.A., U.S. Appl. No. 61/486,658.

Wu, Qiang et al. "Adapting Boosting For Information Retrieval Measures," Learning To Rank For Information Retrieval, vol. 13, pp. 254-270, Jun. 2010, DOI: https://citeseerx.ist.psu.edu/viewdoc/download? doi=10.1.1.157.5117&rep=rep1&type=pdf.

Yadav, Nishant et al. "Session Aware Query Auto Completion Using Extreme Multi-Label Ranking," arXiv Preprint arXiv:2012. 07654v2 [cs.IR], Jun. 7, 2021, (10 pages), available online: https://assets.amazon. science/5e/76/6ebacfc240e1a58b69a6f5347833/session-aware-query-auto-completion-using-extreme-multi-label-ranking. pdf.

Yan, et al., "A Survey of Automated International Classification of Diseases Coding: Development, Challenges, and Applications", Intelligent Medicine, vol. 2, pp. 161-173, Mar. 11, 2022, https://doi.org/10.1016/j.imed.2022.03.003.

Final Rejection Mailed on Mar. 17, 2025 for U.S. Appl. No. 18/520,662, 12 page(s).

Final Rejection Mailed on Sep. 13, 2024 for U.S. Appl. No. 17/934,688, 20 page(s).

Non-Final Rejection Mailed on Feb. 4, 2025 for U.S. Appl. No. 18/500,664, 40 page(s).

Non-Final Rejection Mailed on Feb. 10, 2025 for U.S. Appl. No. 17/934,688, 24 page(s).

Non-Final Rejection Mailed on Sep. 10, 2024 for U.S. Appl. No. 18/520,662, 17 page(s).

Non-Final Rejection Mailed on Sep. 20, 2024 for U.S. Appl. No. 18/047,209, 46 page(s).

Notice of Allowance and Fees Due (PTOL-85) Mailed on Sep. 26, 2024 for U.S. Appl. No. 18/416,276, 10 page(s).

Advisory Action (PTOL-303) Mailed on May 28, 2025 for U.S. Appl. No. 18/520,662, 3 page(s).

Final Rejection Mailed on Apr. 24, 2025 for U.S. Appl. No. 18/047,209, 50 page(s).

Final Rejection Mailed on Jul. 8, 2025 for U.S. Appl. No. 18/500,664, 21 page(s).

Non-Final Rejection Mailed on Jun. 16, 2025 for U.S. Appl. No. 18/520,662, 11 page(s).

Non-Final Rejection Mailed on Jun. 17, 2025 for U.S. Appl. No. 18/434,959, 15 page(s).

Non-Final Rejection Mailed on May 6, 2025 for U.S. Appl. No. 18/390,940, 11 page(s).

Notice of Allowance and Fees Due (PTOL-85) Mailed on Jul. 9, 2025 for U.S. Appl. No. 17/934,688, 20 page(s).

Non-Final Rejection Mailed on Nov. 3, 2025 for U.S. Appl. No. 18/047,209, 34 page(s).

Non-Final Rejection Mailed on Oct. 28, 2025 for U.S. Appl. No. 18/500,664, 22 page(s).

Non-Final Rejection Mailed on Sep. 17, 2025 for U.S. Appl. No. 18/527,910, 21 page(s).

Notice of Allowance and Fees Due (PTOL-85) Mailed on Aug. 8, 2025 for U.S. Appl. No. 18/980,819, 10 page(s).

Notice of Allowance and Fees Due (PTOL-85) Mailed on Sep. 30, 2025 for U.S. Appl. No. 18/390,940, 9 page(s).

Final Rejection Mailed on Dec. 2, 2025 for U.S. Appl. No. 18/434,959, 30 page(s).

Final Rejection Mailed on Dec. 17, 2025 for U.S. Appl. No. 18/520,662, 12 page(s).

Final Rejection Mailed on Feb. 23, 2026 for U.S. Appl. No. 18/500,664, 24 page(s).

Final Rejection Mailed on Jan. 7, 2026 for U.S. Appl. No. 18/527,910, 16 page(s).

Non-Final Rejection Mailed on Apr. 20, 2026 for U.S. Appl. No. 18/588,776, 34 page(s).

Non-Final Rejection Mailed on Mar. 25, 2026 for U.S. Appl. No. 18/434,959, 31 page(s).

Notice of Allowance and Fees Due (PTOL-85) Mailed on Apr. 21, 2026 for U.S. Appl. No. 18/527,910, 10 page(s).

* cited by examiner

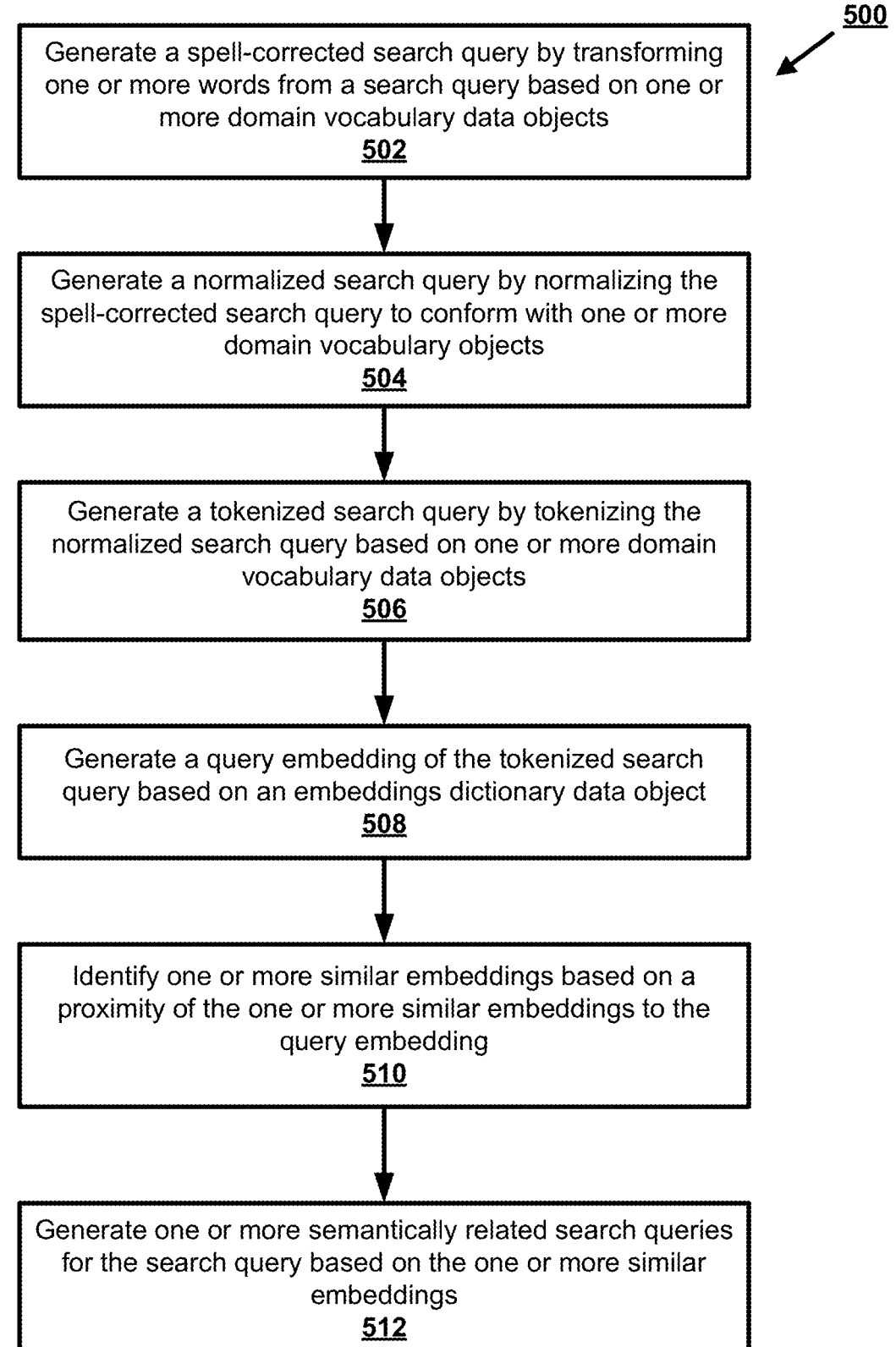

500

Generate a spell-corrected search query by transforming one or more words from a search query based on one or more domain vocabulary data objects
502

Generate a normalized search query by normalizing the spell-corrected search query to conform with one or more domain vocabulary objects
504

Generate a tokenized search query by tokenizing the normalized search query based on one or more domain vocabulary data objects
506

Generate a query embedding of the tokenized search query based on an embeddings dictionary data object
508

Identify one or more similar embeddings based on a proximity of the one or more similar embeddings to the query embedding
510

Generate one or more semantically related search queries for the search query based on the one or more similar embeddings
512

FIG. 5

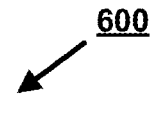
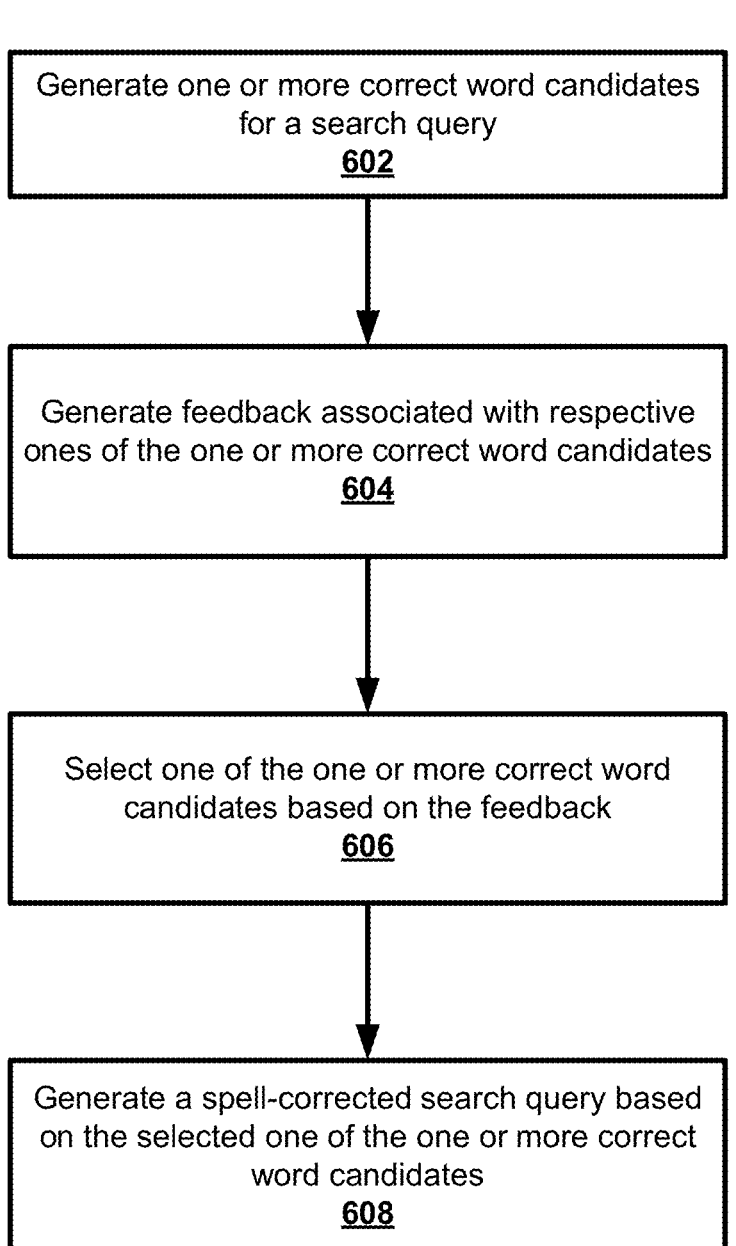
FIG. 6

800

Determine one or more misspelling patterns based on one or more search query logs
802

Extract one or more words from a content set
804

Generate one or more augmented words by augmenting the one or more training words based on the one or more misspelling patterns
806

Generate spell-check training data based on the one or more augmented words
808

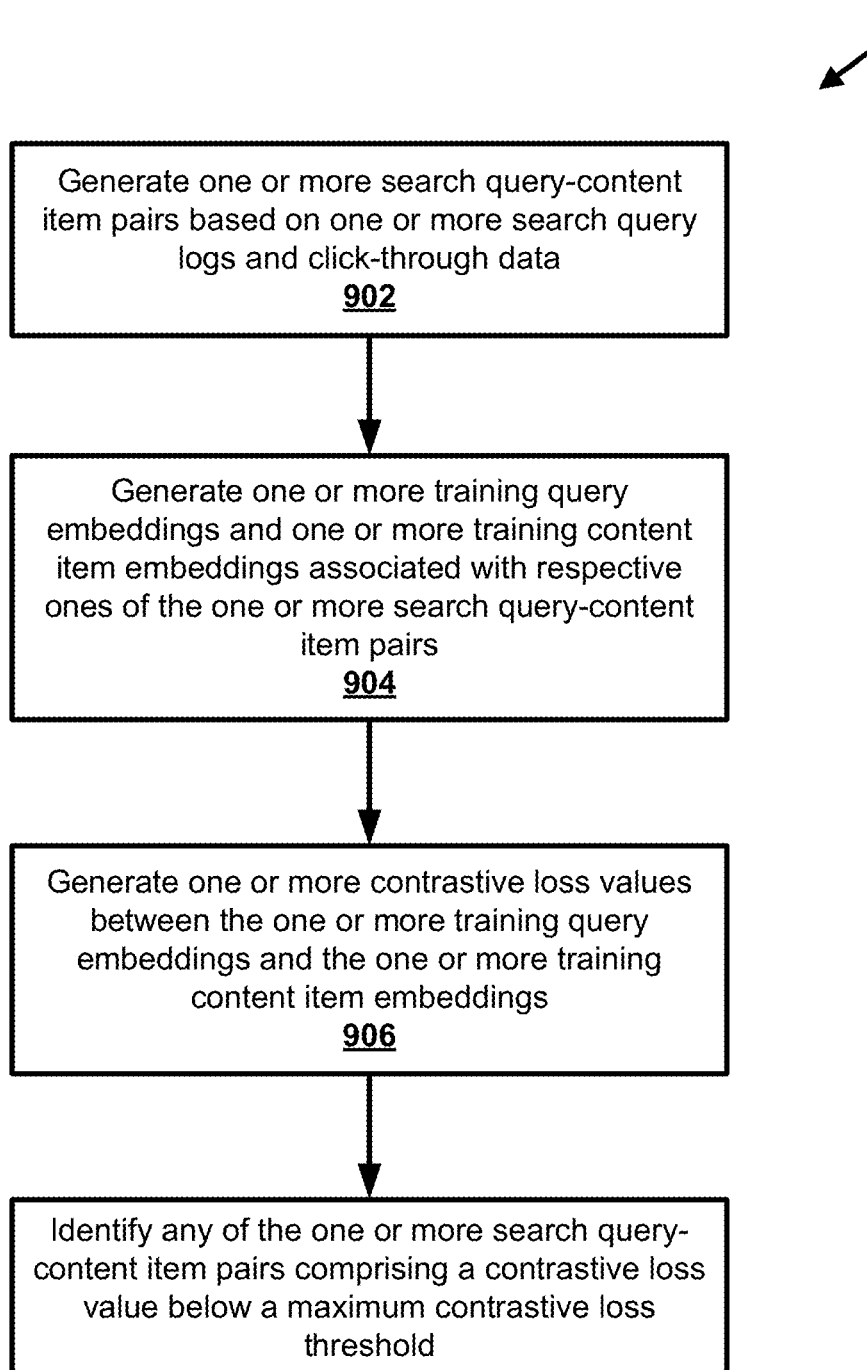

900

Generate one or more search query-content
item pairs based on one or more search query
logs and click-through data
902

Generate one or more training query
embeddings and one or more training content
item embeddings associated with respective
ones of the one or more search query-content
item pairs
904

Generate one or more contrastive loss values
between the one or more training query
embeddings and the one or more training
content item embeddings
906

Identify any of the one or more search query-
content item pairs comprising a contrastive loss
value below a maximum contrastive loss
threshold
908

FIG. 9

MACHINE LEARNING TECHNIQUES FOR GENERATING DOMAIN-AWARE QUERY EXPANSIONS

CROSS REFERENCE TO RELATED APPLICATION

This application claims the priority of U.S. Provisional Application No. 63/578,459, entitled "DOMAIN-AWARE QUERY EXPANSION," filed on Aug. 24, 2023, the disclosure of which is hereby incorporated by reference in its entirety.

BACKGROUND

Various embodiments of the present disclosure address technical challenges related to search engines. Conventional search engines may comprise keyword-based searching. Keyword-based searching techniques look for exact search queries in a corpus and follow manually crafted and static rules to find a most relevant result, such as a page, and/or the like, in a search domain. Such matching techniques fail to account for contextual information associated with a search query which, as a result, reduces the relevance and accuracy of query results while increasing of the likelihood of null results. In some cases, for example, keywords may be ambiguous or have different meanings in different contexts. For example, a "bank" may be interpreted in the context of a riverbank or a bank teller leading to different and incompatible results. In addition, keyword-based searching is difficult to manage and fails scale because conventional keyword search requires a large group of human-in-the-loop to constantly look over search queries and available contents to create better tags and keywords.

Other traditional search engines may include query understanding engines that are based on natural language processing vectorized search using embeddings to provide advantages over keyword-based search systems by identifying contextual information for a search query. For example, embeddings may capture the semantic meaning of a search query and its relationship to other queries and potential search results. For instance, an embedding may capture how a relationship between "tooth" to "dentist" is comparable to "eye" to "ophthalmologist." While embeddings may be effective at enabling semantic search in many cases, they do not account for custom rules and are difficult to interpret.

Still other traditional search engines include vectorized search engines that are conventionally leveraged when a corpus of contents is very large or when content is in abundance such that embeddings may be generated to capture the meaning of the content and used to map search query intent to relevant content. However, vectorized search engines are limited when the number of contents is minimal and especially when several search rules are applied that override the semantic meaning of content. For example, a user might not be interested in associating a search query on "dental cleaning" to a web page that discusses "dental hygiene" but would rather be interested in webpage that locates a nearest dentist. Embeddings are unable to capture such rules.

In addition to the above downsides, conventional search embeddings (e.g., used in query understanding engines, vectorized search engines, etc.) are susceptible to biases that may lead to unreliable and inaccurate results. For example, traditional embedding models are trained on a large number of content that's been crawled from the Internet. Since embeddings are great at capturing relationships, they become a victim of biases in data. For example, the relationship between "man" and "doctor" is not equivalent to "female" and "doctor," but rather, a relationship between "female" and "nurse" may be more prevalent. Such harmful biases are even more so harmful when content is sparse. While much research is being allocated to reducing such biases and other more harmful hidden biases it leaves much to be desired.

Various embodiments of the present disclosure address technical challenges related to predicting search query intent and domain-based contextual ranking of content items to address the various shortcomings of existing information retrieval systems.

BRIEF SUMMARY

In general, various embodiments of the present disclosure provide methods, apparatus, systems, computing devices, computing entities, and/or the like for generating domain-aware query expansions.

Various embodiments of the present disclosure make important technical contributions to improving predictive accuracy of predictive machine learning models used in generating responses to search queries by generating embeddings (from which similar embeddings are used to generate semantically related search queries) of an embeddings dictionary data object, where the embeddings are associated with a plurality of words, terms, or phrases associated with one or more domain vocabulary data objects. As described herein, conventional keyword and vectorized search systems are unable to incorporate domain context and rules in determining relevancy of content items to search queries. Accordingly, by expanding search queries using a set of embeddings associated with a pre-determined set of vocabulary specific to a content set, the techniques described herein improve functionality of information retrieval systems and provide an enhanced and hybrid search approach that addresses the challenges facing conventional embedding and keyword search.

In some embodiments, a computer-implemented method comprises: generating, by one or more processors, a spell-corrected search query by transforming one or more query words from a search query based on one or more domain vocabulary data objects; generating, by the one or more processors, a normalized search query by normalizing the spell-corrected search query to conform with the one or more domain vocabulary data objects; generating, by the one or more processors, a tokenized search query by tokenizing the normalized search query based on the one or more domain vocabulary data objects; generating, by the one or more processors, a query embedding of the tokenized search query based on an embeddings dictionary data object associated with the one or more domain vocabulary data objects; identifying, by the one or more processors, one or more similar embeddings from the embeddings dictionary data object based on a proximity of the one or more similar embeddings to the query embedding; generating, by the one or more processors, one or more semantically related search queries for the search query based on the one or more similar embeddings; retrieving, by the one or more processors, one or more content items based on the one or more semantically related search queries; and generating, by the one or more processors, one or more responses to the search query based on the one or more content items.

In some embodiments, a computing system comprising memory and one or more processors communicatively coupled to the memory, the one or more processors configured to: generate a spell-corrected search query by transforming one or more query words from a search query based on one or more domain vocabulary data objects; generate a normalized search query by normalizing the spell-corrected search query to conform with the one or more domain vocabulary data objects; generate a tokenized search query by tokenizing the normalized search query based on the one or more domain vocabulary data objects; generate a query embedding of the tokenized search query based on an embeddings dictionary data object associated with the one or more domain vocabulary data objects; identify one or more similar embeddings from the embeddings dictionary data object based on a proximity of the one or more similar embeddings to the query embedding; generate one or more semantically related search queries for the search query based on the one or more similar embeddings; retrieve one or more content items based on the one or more semantically related search queries; and generate one or more responses to the search query based on the one or more content items.

In some embodiments, one or more non-transitory computer-readable storage media including instructions that, when executed by one or more processors, cause the one or more processors to: generate a spell-corrected search query by transforming one or more query words from a search query based on one or more domain vocabulary data objects; generate a normalized search query by normalizing the spell-corrected search query to conform with the one or more domain vocabulary data objects; generate a tokenized search query by tokenizing the normalized search query based on the one or more domain vocabulary data objects; generate a query embedding of the tokenized search query based on an embeddings dictionary data object associated with the one or more domain vocabulary data objects; identify one or more similar embeddings from the embeddings dictionary data object based on a proximity of the one or more similar embeddings to the query embedding; generate one or more semantically related search queries for the search query based on the one or more similar embeddings; retrieve one or more content items based on the one or more semantically related search queries; and generate one or more responses to the search query based on the one or more content items.

BRIEF DESCRIPTION OF THE DRAWINGS

FIG. 5 is a flowchart diagram of an example process for generating semantically related search queries in accordance with some embodiments of the present disclosure.

FIG. 6 is a flowchart diagram of an example process for correcting spelling of words in search queries in accordance with some embodiments of the present disclosure.

FIG. 9 is a flowchart diagram of an example process for fine-tuning a domain-aware sentence embedding machine learning model in accordance with some embodiments of the present disclosure.

DETAILED DESCRIPTION

Figure 1:
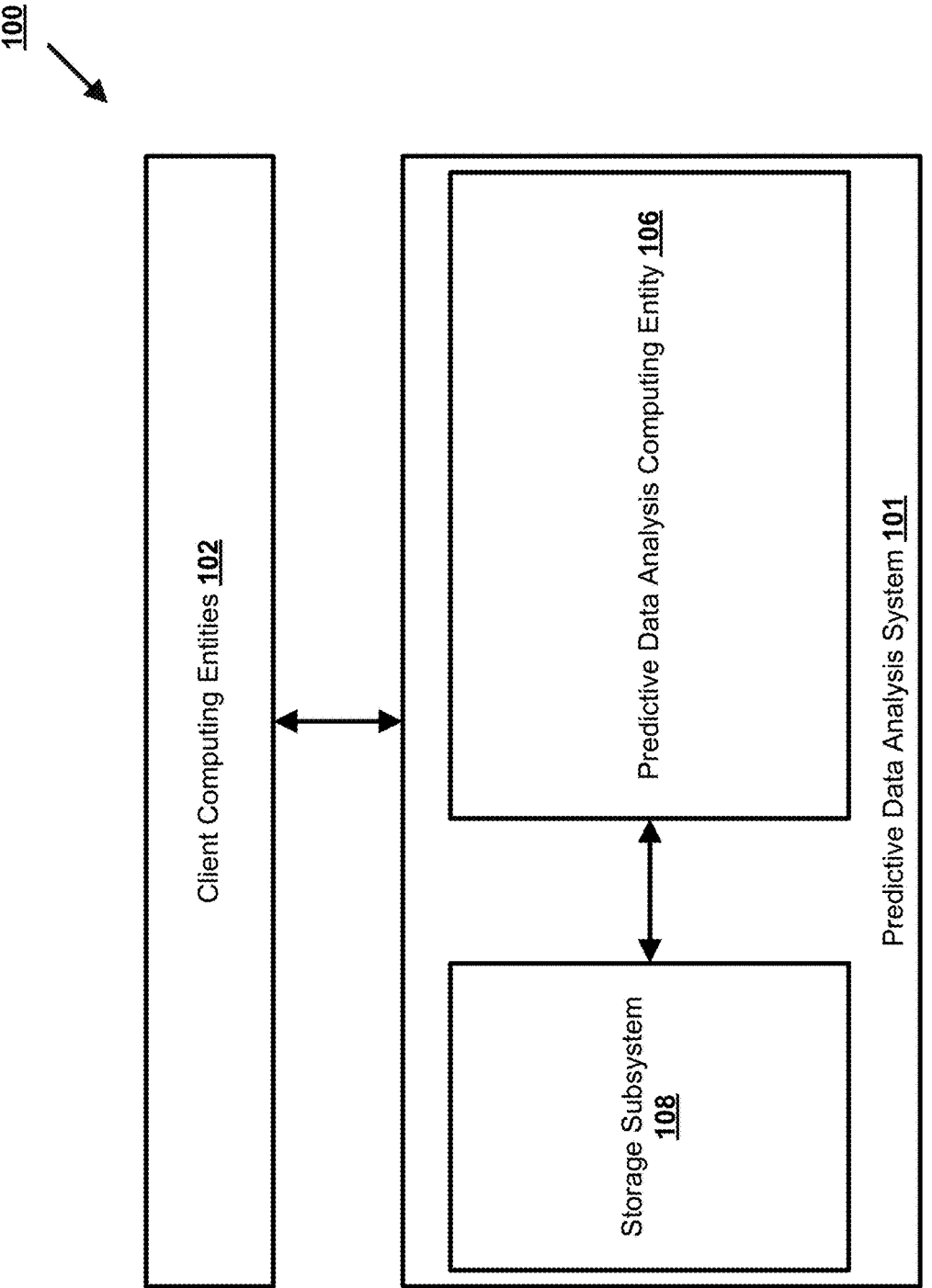
FIG. 1 provides an example overview of an architecture in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 provides an example overview of an architecture 100 in accordance with some embodiments of the present disclosure. The architecture 100 includes a predictive data analysis system 101 configured to receive predictive data analysis/search requests from client computing entities 102, process the predictive data analysis/search requests to generate predictions, retrieve, and/or receive search results based on the generated predictions, and provide the generated predictions and/or search results to the client computing entities 102. The example architecture 100 may be used in a plurality of domains and not limited to any specific application as disclosed herewith. The plurality of domains may include banking, healthcare, industrial, manufacturing, education, retail, to name a few.

In accordance with various embodiments of the present disclosure, an information retrieval system provides semantic search capabilities of embeddings/vectorized search and the flexibility of keyword search by expanding search queries using a set of embeddings associated with a predetermined set of vocabulary specific to a content set. As such, embodiments of the present disclosure provide an enhanced and hybrid search approach that addresses the challenges facing conventional embedding and keyword search. The techniques disclosed herewith comprise domain-aware query understanding that is customizable and search query expansion that is based on a set of vocabulary embeddings that may be modified to comply with a variety of customizable rules. The disclosed techniques will lead to higher accuracy of performing predictive operations as needed on certain sets of data. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training predictive machine learning models. In further embodiments, an information retrieval system comprises or is communicatively coupled to a predictive data analysis computing entity comprising one or more predictive machine learning models that are configured to preprocess a search query via correct spelling, normalizing, and tokenizing to conform the search query with or resemble vocabulary and/or context from content items of the content set prior to search query expansion, thus improving the accuracy and performance of the information retrieval system.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis/search requests from client computing entities 102, process the predictive data analysis/search requests to generate predictions, retrieve, and/or receive search results based on the generated predictions, and provide the generated predictions and/or search results to the client computing entities 102.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Example Predictive Data Analysis Computing Entity

Figure 2:
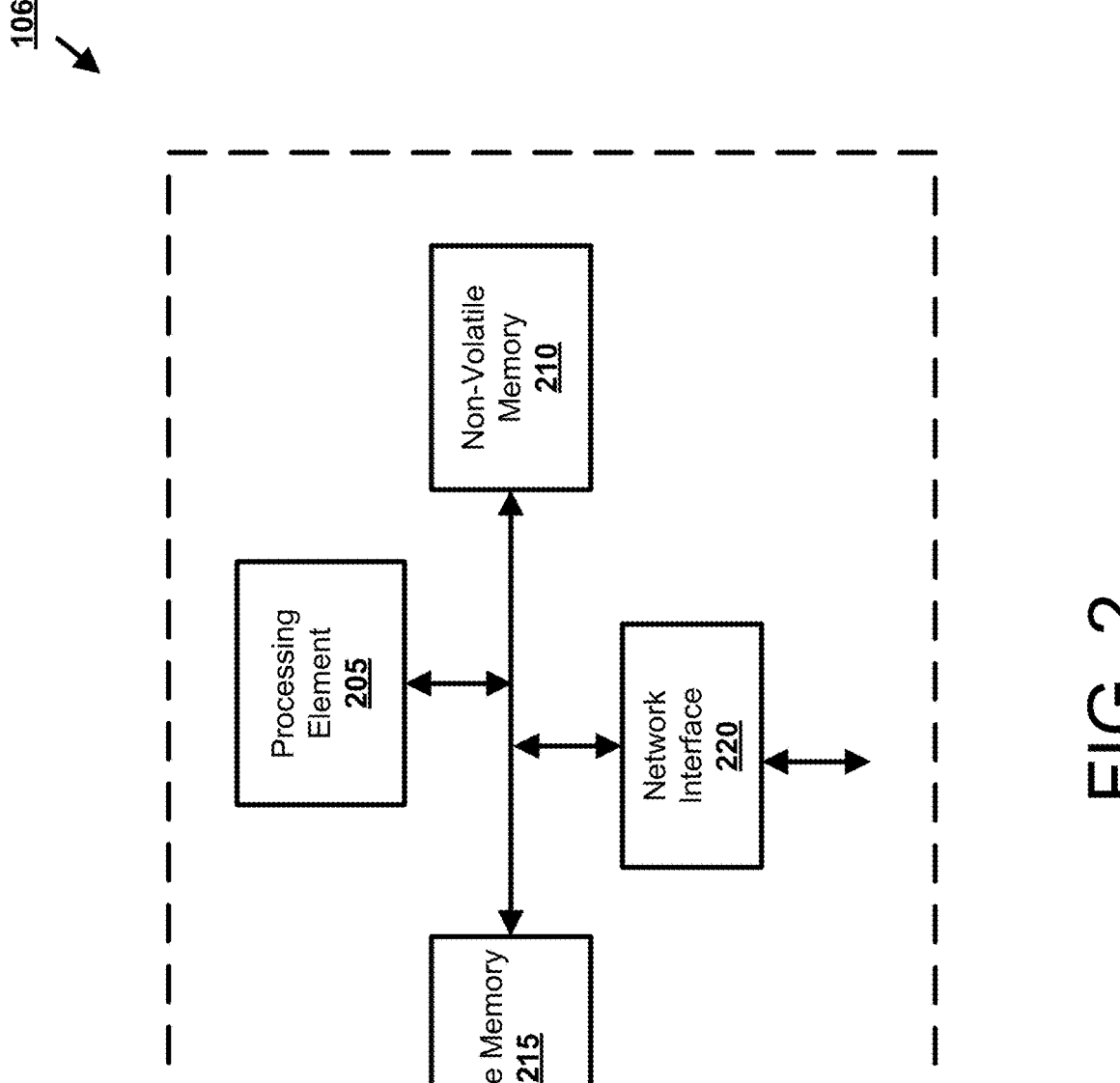
FIG. 2 provides an example predictive data analysis computing entity in accordance with some embodiments of the present disclosure.

FIG. 2 provides an example predictive data analysis computing entity 106 in accordance with some embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes may be performed on data, content, information, and/or similar terms used herein interchangeably.

As shown in FIG. 2, in some embodiments, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the predictive data analysis computing entity 106 may further include, or be in communication with, non-volatile media (also referred to as non-volatile storage, memory, memory storage, memory circuitry, and/or similar terms used herein interchangeably). In some embodiments, the non-volatile storage or memory may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the predictive data analysis computing entity 106 may further include, or be in communication with, volatile media (also referred to as volatile storage, memory, memory storage, memory circuitry, and/or similar terms used herein interchangeably). In some embodiments, the volatile storage or memory may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in some embodiments, the predictive data analysis computing entity 106 may also include one or more network interfaces 220 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Example Client Computing Entity

Figure 3:
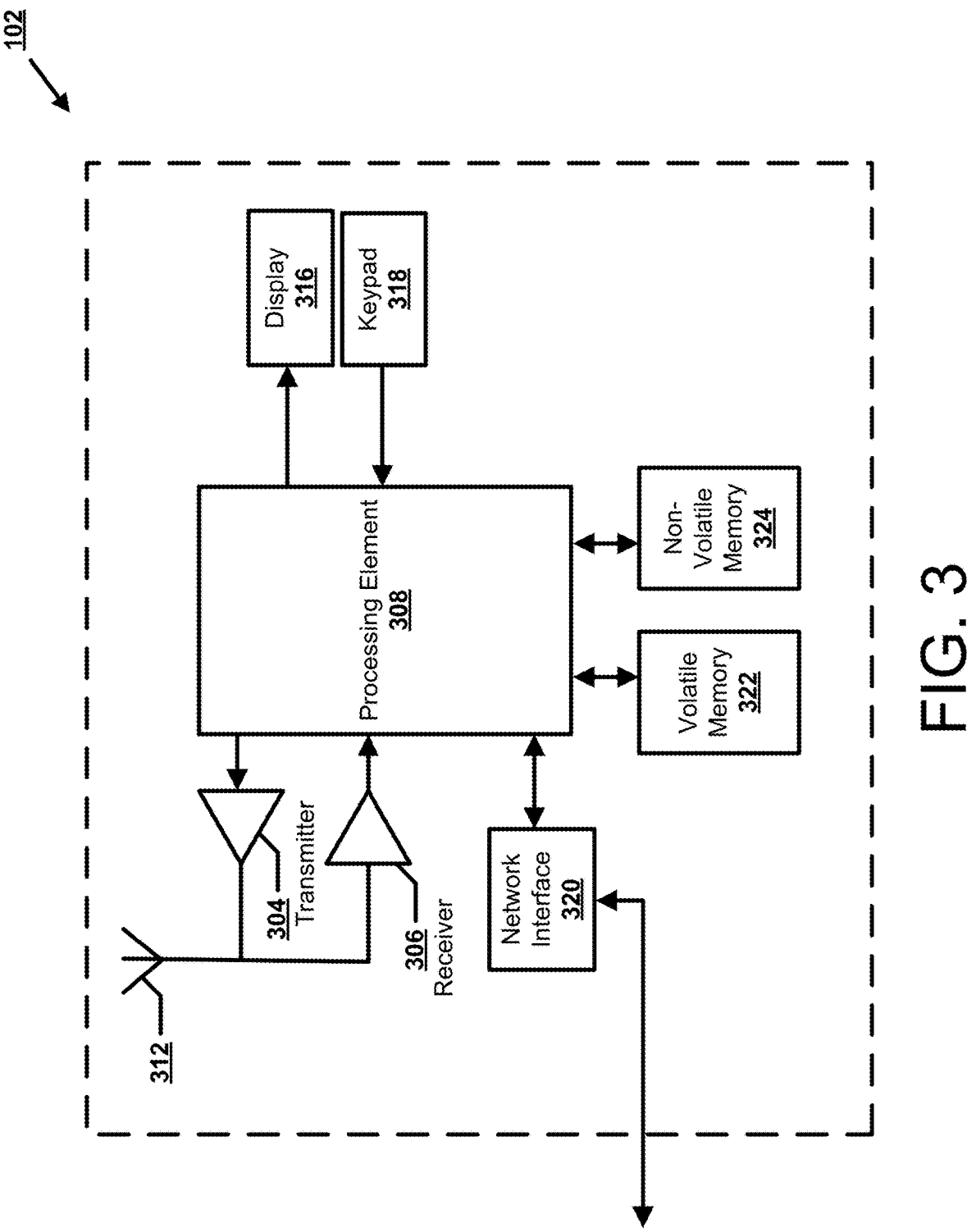
FIG. 3 provides an example client computing entity in accordance with some embodiments of the present disclosure.

FIG. 3 provides an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In some embodiments, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 may communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 may also download changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface (that may include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface may comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 may include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entity 102 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory may store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the client computing entity 102 or accessible through a browser or other user interface for communicating with the predictive data analysis computing entity 106 and/or various other computing entities.

In another embodiment, the client computing entity 102 may include one or more components or functionalities that are the same or similar to those of the predictive data analysis computing entity 106, as described in greater detail above. As will be recognized, these architectures and descriptions are provided for example purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. Examples of Certain Terms

In some embodiments, the term "search query" refers to a data construct that describes a request for information. A search query may comprise one or more words. According to various embodiments of the present disclosure, search queries may be received by a predictive data analysis system from one or more client computing entities, either directly or indirectly via, e.g., an information retrieval system comprising a search engine. According to various embodiments of the present disclosure, a search query may be received by a predictive data analysis system from one or more client computing entities, either directly or indirectly via, e.g., an information retrieval system comprising a search engine.

In some embodiments, the term "word" refers to a data construct that describes an element of a search query comprising a meaning and intent. Examples of a word may comprise a term, phrase, or string of characters, numbers, symbols, or any combination thereof.

In some embodiments, the term "spell-corrected search query" refers to a data construct that describes a search query that has been corrected for spelling (errors) or conformed to a spelling convention. For example, a spell-corrected search query is generated by spell-correcting (e.g., via transforming or replacing) one or more words e.g., that are identified as being misspelled, of a search query based on one or more domain vocabulary data objects. According to various embodiments of the present disclosure, a spell-correct machine learning model comprising a neural edit distance machine learning model and a language machine learning model may be used to generate a spell-corrected search query.

In some embodiments, the term "domain vocabulary data object" refers to a data construct that describes a vocabulary associated with a content set. A domain vocabulary data object may comprise one or more data entries representative of words comprising a vernacular of (or appear in) a content set. A domain-aware sentence embedding machine may generate a plurality of embeddings of an embeddings dictionary data object for a plurality of words associated with one or more domain vocabulary data objects. In some embodiments, a domain vocabulary data object may be generated by extracting and/or analyzing text from content items of a content set and categorizing or labeling the content items based on the extracted/analyzed text in combination with search and browsing activities. For example, a domain vocabulary data object of a website may be generated by web crawling one or more webpages of the website and analyzing a history of search query logs to extract a vocabulary, and context, that best represents a language of the webpages or website. According to various embodiments of the present disclosure, one or more customizable rules may be applied to one or more data entries of a domain vocabulary data object. In some embodiments, a customizable rule comprises configuring certain data entries of a domain vocabulary data object such that specific topics of content are disassociated with one or more other topics of content. For example, "abortion" or other sensitive topics may be removed or excluded from words (used in queries) about pregnancy, such that a domain-aware sentence embedding machine may prevent relating a query (query embeddings) to sensitive topics (similar embeddings).

In some embodiments, the term "content set" refers to a corpus comprising one or more content items. A content set may comprise content items that are associated with a specific domain from which one or more domain vocabulary data objects may be may derive or extract a vocabulary from.

In some embodiments, the term "normalized search query" refers to a data construct that describes a search query that has been normalized to conform with one or more domain vocabulary data objects. For example, a normalized search query may comprise a search query (either original, or spell-corrected) including one or more words that have been modified such that the search query is in a format that is closer to or consistent with words, associated with a domain vocabulary data object.

In some embodiments, the term "normalize" of "normalizing" refers to a process of modifying data into a standard form. Data may be normalized such that multiple instances comprising a same data appear or exist in a consistent manner. A search query may be normalized by modifying one or more words of the search query to conform with a domain vocabulary data object. According to various embodiments of the present disclosure, search queries are normalized to ensure that variations of a same word, term, or phrase are conformed to a common form based on one or more domain vocabulary data objects. For example, words such as "covid19" or "covid 19" are normalized to "covid_19."

In some embodiments, the term "tokenized search query" refers to a data construct that describes a search query that has been converted into one or more tokens. A search query may be tokenized such that one or more components of the search query is optimized for relevancy or matching with a content set of which a search with the search query is performed on.

In some embodiments, the term "token" refers to a data construct that describes a representative unit comprising a sequence of one or more words, terms, phrases, characters, numbers, symbols, or any combination thereof. Tokens may be used to discretize one or more portions of a search query into distinct concepts, features, or terminology. In some embodiments, a tokenized search query is generated by tokenizing a normalized search query into one or more tokens comprising domain-specific keywords based on one or more domain vocabulary data objects.

In some embodiments, the term "tokenize" or "tokenizing" refers to an operation that extracts and converts one or more words, terms, phrases, characters, numbers, symbols, or any combination thereof, of a search query into one or more tokens. For example, a search query may be tokenized by mapping one or more components of the search query into one or more tokens based on an index of predefined keywords. According to various embodiments of the present disclosure, a search query may be tokenized based on one or more domain vocabulary data objects such that each domain-specific keyword, term, or phrase within a search query may be identified and discretized into individual tokens.

In some embodiments, the term "embedding" refers to a data construct that describes a latent representation of data comprising one or more features. For example, an embedding of data may be expressed as a vector comprising one or more numbers representative of one or more features associated with content of the data. In some embodiments, an embedding may be generated by mapping one or more features to one or more elements in a vector space. According to various embodiments of the present disclosure, an embedding comprises a feature associated with machine learning model input data. One or more embeddings may be generated for machine learning model input data such that the machine learning model input data may be provided in a format suitable for analysis or processing by a machine learning model.

In some embodiments, the term "query embedding" refers to a data construct that describes an embedding of a search query. According to various embodiments of the present disclosure, a query embedding of a tokenized search query is generated based on an embeddings dictionary data object comprising embeddings associated with one or more domain vocabulary data objects. The embeddings dictionary data object may be used to identify an embedding for each of one or more tokens comprising the tokenized search query.

In some embodiments, the term "embeddings dictionary data object" refers to a data construct that describes an index of embeddings. An embeddings dictionary data object may comprise embeddings of one or more words associated with one or more domain vocabulary data objects. According to various embodiments of the present disclosure, a plurality of embeddings of an embeddings dictionary data object is generated using a domain-aware sentence embedding machine learning model based on one or more domain vocabulary data objects.

In some embodiments, the term "similar embedding" refers to a data construct that describes an embedding that is determined to be similar to a query embedding. For example, determining one or more similar embeddings may comprise identifying the one or more similar embeddings as being semantically similar to a query embedding. According to various embodiments of the present disclosure, a query embedding may be compared with one or more embeddings in the embeddings dictionary data object to identify one or more similar embeddings based on proximity of the one or more similar embeddings to the query embedding within a domain vector space. In some embodiments, the proximity may be determined using a nearest neighbor search or any other distance metric-based search to find embeddings that are semantically similar in the domain vector space. In some embodiments, identifying one or more similar embeddings (for a query embedding) may comprise determining one or more clusters comprising the one or more similar embeddings and the query embedding. In some embodiments, one or more similar embeddings are determined based on a nearest neighbor search in a domain vector space with respect to a query embedding.

In some embodiments, the term "cluster" refers to a grouping of data, such as embeddings, within a domain vector space based on one or more characteristics or features of the data. In some embodiments, one or more clusters of embeddings from an embeddings dictionary data object may be generated to categorize and identify similar embeddings.

In some embodiments, the term "domain vector space" refers to a data construct that describes a representation of a domain comprising one or more dimensions representative of features associated with the domain. One or more vectors comprising embeddings may be mapped to respective one or more coordinates or locations associated with one or more dimensions of a domain vectors space based on features associated with the embeddings. According to various embodiments of the present disclosure, a domain vector space may be used to model one or more domain vocabulary data objects associated with a content set.

In some embodiments, the term "semantically related search query" refers to a data construct that describes an alternative search query that has been determined to be semantically similar to a search query submitted by a user. According to various embodiments of the present disclosure, one or more semantically related search queries are generated for a search query based on one or more similar embeddings.

In some embodiments, the term "spell-correct machine learning model" refers to a data construct that describes parameters, hyperparameters, and/or defined operations of a machine learning model that is configured to generate spell-corrected search queries by spell-correcting (e.g., via transforming or replacing) one or more words e.g., that are identified as being misspelled, of a search query based on one or more domain vocabulary data objects. According to various embodiments of the present disclosure, a spell-correct machine learning model comprises a neural edit distance machine learning model and a language machine learning model. In some embodiments, a spell-correct machine learning model may be configured to (i) generate, using a neural edit distance machine learning model, one or more correct word candidates for a search query, (ii) generate, using a language machine learning model, feedback associated with respective ones of the one or more correct word candidates, (iii) select one of the one or more correct word candidates based on the feedback, and (iv) generate a spell-corrected search query based on the selected one of the one or more correct word candidates. In some embodiments, selecting one of the one or more correct word candidates may comprise selecting one of the one or more correct word candidates comprising the highest probability score that satisfies a minimum probability score threshold. If none of the one or more correct word candidates satisfy the minimum probability score threshold, the language machine learning model may generate a request or data output to signal the neural edit-distance machine learning model to generate further correct word candidates.

In some embodiments, the term "correct word candidate" refers to a data construct that describes a prediction comprising a word determined to be a correct spelling of an incorrectly spelled word identified in a search query. One or more correct word candidates may be generated for one or more words e.g., that are identified as being misspelled, of a search query by a neural edit distance machine learning model. In some embodiments, a correct word candidate may be generated by transforming or replacing a word from a search query based on minimum edit distance with respect to one or more words associated with one or more domain vocabulary data objects.

In some embodiments, the term "neural edit distance machine learning model" refers to a data construct that describes parameters, hyperparameters, and/or defined operations of a machine learning model that is configured to generate correct word candidates. A neural edit distance machine learning model may generate correct word candidates by transforming or replacing words, e.g., that are identified as being misspelled, of a search query to words associated with one or more domain vocabulary data objects based on minimum edit distance. Words of a search query may be identified by the neural edit distance machine learning model as incorrect words based on one or more domain vocabulary data objects. For example, a neural edit distance machine learning model may recursively modify one or more words e.g., that are identified as being misspelled, of a search query with a minimal edit distance to match one or more words associated with one or more domain vocabulary data objects and/or determine word candidates associated with the one or more domain vocabulary data objects comprising low edit distances with respect to the search query. A neural edit distance machine learning model may further receive feedback generated by a language machine learning model on the modified words. In some embodiments, the feedback comprises one or more probability scores associated with respective ones of one or more correct word candidates. A probability score may comprise a probability of a correct word candidate being correct or appropriate within a context of a search query. A correct word candidate despite having a low edit distance to one or more words associated with one or more domain vocabulary data objects, may not necessarily be a best fit for a specific context of a search query. As an example, a probability score comprises a posterior probability associated with a context of a correct word candidate in view of one or more words proceeding a word in which the correct word candidate may replace within a search query. In some other embodiments, feedback generated by a language machine learning model comprises an identification of correct word candidates comprising highest probability scores that exceed a minimum probability threshold. As such, according to various embodiments of the present disclosure, a language machine learning model may be paired with a neural edit distance machine learning model in a spell-correct machine learning model to generate spell-corrected search queries based on correct word candidates with the highest probability of being correct based on context. In some embodiments, the neural edit distance machine learning model comprises long short-term memory (LSTM) or a bidirectional gated recurrent unit (GRU) network. In some embodiments, a neural edit distance machine learning model may be trained to learn edit distance and order of letters with spell-check training data comprising incorrect words and associated correct word labels.

In some embodiments, the term "edit distance" refers to a data construct that describes a measurement of similarity between two words based on a minimum number of editing operations (e.g., insertion, deletion, substitution) needed to transform one of the two words into the other word.

In some embodiments, the term "spell-check training data" refers to a data construct that describes a dataset that may be used to train a neural edit distance machine learning model. Spell-check training data may comprise incorrect words and associated correct word labels. According to various embodiments of the present disclosure, spell-check training data is generated based on a content set and one or more search query logs associated with the content set (e.g., such that a neural edit distance machine learning model may be trained with a domain-specific context). In some embodiments, generating the spell-check training data further comprises (i) determining one or more misspelling patterns based on the one or more search query logs, (ii) extracting one or more training words from the content set, (iii) generating one or more augmented words by augmenting the one or more training words based on the one or more misspelling patterns, and (iv) generating the spell-check training data based on the one or more augmented words. In some embodiments, generating the one or more augmented words further comprises augmenting the one or more training words based on one or more nearest keys on a keyboard (e.g., accounting for keys close to each other that are commonly swapped).

In some embodiments, the term "language machine learning model" refers to a data construct that describes parameters, hyperparameters, and/or defined operations of a machine learning model that is configured to determine a probability of an entirety of a word sequence is valid or correct and provide feedback to a neural edit distance machine learning model on correct word candidates generated by the neural edit distance machine learning model. The feedback may be generated by the language machine learning model to indicate likelihood of correctness of the correct word candidates given a particular context (e.g., maximum posterior probability) based on a search query associated with the correct word candidates and a content set the language machine learning model is trained on. A language machine learning model may be trained based on a content set. In some embodiments, training a language machine learning model may further comprise using skip-gram to predict one or more context words for given target words based on a content set. In some embodiments, the language machine learning model comprises a bag-of-words machine learning model. According to various embodiments of the present disclosure, a language machine learning model may be used to guide a neural edit distance machine learning model in generating correct word candidates that are context relevant with respect to a content set search queries of which the correct word candidates are generated for. In some embodiments, a language machine learning model may (i) receive from a neural edit distance machine learning model, correct word candidates for one or more words of a search query, (ii) determine probability scores associated with respective ones of the correct word candidates, and (iii) identify correct word candidates comprising highest probability scores representative of a greatest likelihood of correctness given a particular context (e.g., maximum posterior probability) based on the search query and a content set the language machine learning model is trained on. The correct word candidates identified with the highest probability scores may be provided to the neural edit distance machine learning model as feedback for generating relevant correct word candidates for a particular search query.

In some embodiments, the term "domain-aware sentence embedding machine learning model" refers to a data construct that describes parameters, hyperparameters, and/or defined operations of a machine learning model that is configured to generate a plurality of embeddings of an embeddings dictionary data object for a plurality of words associated with one or more domain vocabulary data objects. According to various embodiments of the present disclosure, a domain-aware sentence embedding machine learning model may use the (embeddings of the) embeddings dictionary data object to generate a query embedding of a search query (e.g., that has been spell-corrected, normalized, and tokenized) and identify one or more similar embeddings from the embeddings dictionary data object based on a proximity of the one or more similar embeddings to the query embedding within a domain vector space. In some embodiments, a domain-aware sentence embedding machine learning model comprises a pre-trained sentence transformer model that is further fine-tuned (e.g., on Bidirectional Encoder Representations from Transformers (BERT)) using next sentence prediction. In some embodiments, the domain-aware sentence embedding machine learning model is pre-trained by generating and/or initializing one or more pre-trained weights based on semantic pairs. The domain-aware sentence embedding machine learning model may be further fine-tuned by generating one or more fine-tuned weight. In some embodiments, one or more fine-tuned weights are generated for the domain-aware sentence embedding machine learning model by updating the one or more pre-trained weights based on predictions of next sentences of one or more training sentences associated with search queries from a search query log and a plurality of content items from a content set. Next sentence prediction (NSP) may be used to fine-tune a domain-aware sentence embedding machine learning model to obtain a general understanding of a domain's (e.g., content set) language and vocabulary. To improve language understanding via use of NSP, a domain-aware sentence embedding machine learning model may be further fine-tuned with semantic pairs. In some embodiments, one or more fine-tuned weights are generated for the domain-aware sentence embedding machine learning model by further updating the one or more pre-trained weights based on contrastive loss between embeddings associated with semantic pairs. Semantic pairs may be generated by using search query logs, click-through data, and any relevant taxonomies (such as codes, e.g., International Classification of Diseases (ICD) and Current Procedural Terminology (CPT)) associated with a content set. In some embodiments, one or more fine-tuned weights are generated for the domain-aware sentence embedding machine learning model by (a) generating one or more search query-content item pairs based on one or more search query logs and click-through data, (b) for each of the one or more search query-content item pairs, generating a training query embedding and a training content item embedding associated with the search query-content item pair, (c) for each of the one or more search query-content item pairs, determining a contrastive loss value between the training query embedding and the training content item embedding, and (d) identifying any of the one or more search query-content item pairs comprising a contrastive loss value below a maximum contrastive loss threshold. As such, one or more fine-tuned weights may be generated based on minimizing a contrastive loss function representing a similarity between embeddings of semantic pairs and in turn, similarity of the semantic pairs (pairing of a search query with a content item) themselves.

In some embodiments, the term "semantic pair" refers to a data construct that describes a pair of sentences comprising a given amount of semantic similarity. According to various embodiments of the present disclosure, a domain-aware sentence embedding machine learning model may be fine-tuned based on one or more semantic pairs. In some embodiments, a semantic pair may comprise a search query-content item pair.

In some embodiments, the term "search query-content item pair" refers to a data construct that describes a pairing that associates a search query with a content item. According to various embodiments of the present disclosure, one or more search query-content item pairs are generated based on one or more search query logs and click-through data. In particular, a search query-content item pair may be generated by determining an association of a search query in a search query log with a content item based on a selection or click (e.g., determined from the click-through data) of the content item when provided as a result for the search query. For example, a search query-content item pair may comprise a search query "backpain" and a content item "chiropractic" that a user providing the search query clicked when searching for "backpain."

In some embodiments, the term "content item embedding" refers to a data construct that describes an embedding of a content item. According to various embodiments of the present disclosure, as part of training a domain-aware sentence embedding machine learning model, a content item embedding associated with a search query-content item pair may be generated to determine a contrastive loss value between an embedding of a query associated with the search query-content item pair and the content item embedding.

IV. Overview

Various embodiments of the present disclosure make important technical contributions to improving predictive accuracy of predictive machine learning models used in generating responses to search queries by generating embeddings (from which similar embeddings are used to generate semantically related search queries) of an embeddings dictionary data object, where the embeddings are associated with a plurality of words, terms, or phrases associated with one or more domain vocabulary data objects. The one or more domain vocabulary data objects may be representative of a vocabulary associated with a content set and may be generated by extracting and/or analyzing text from content items of a content set and categorizing or labeling the content items based on the extracted/analyzed text in combination with search and browsing activities. The domain-aware sentence embedding machine learning model may comprise a pre-trained sentence transformer model that is fine-tuned based on embeddings of search query-content item pairs, generated from search query logs and click-through data, comprising a contrastive loss below a maximum contrastive loss threshold. This approach improves training speed and training efficiency of training predictive machine learning models. It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative model architectures.

Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

For example, various embodiments of the present disclosure improve predictive accuracy of predictive machine learning models by generating embeddings of an embeddings dictionary data object, where the embeddings are associated with a plurality of words, terms, or phrases associated with one or more domain vocabulary data objects. As described herein, understanding the intent of a search query is a first step in retrieving relevant content for the search query. A search query may comprise words that are misspelled and contain sentence fragments or grammatical issues. Additionally, different users may phrase a same query in different ways, e.g., "dental plan benefit" vs. "does my plan cover dental," or "covid19" vs. "covid 19"—to a human such nuances may be obvious, however, a machine may interpret variances in query phrasing to mean different things.

Conventional query understanding engines may use embeddings of a search query and a corpus of documents to determine nearest documents in the corpus. According to various embodiments of the present disclosure, a search query may be expanded to other alternatives by using a domain-aware, rule complying, embedding machine learning model framework. Query expansion may be used to improve the recall (e.g., percentage of correct items that are returned in search results) of information retrieval systems. For example, a search query provided by a user may be transformed or modified by an information retrieval system (comprising or communicatively coupled to a predictive data analysis computing entity comprising one or more predictive machine learning models) into one or more additional queries related to the search query to improve retrieval performance.

In some embodiments, an information retrieval system generates embedding-driven query expansions of search queries that are both domain aware and rule compliant. The embedding-driven query expansions may be easily customized by adjusting a vocabulary (embeddings dictionary), e.g., a domain aware and rule-compliant vocabulary. In particular, the disclosed query expansion may be content agnostic and may be easily adjusted to function on any content set by providing/modifying a specific vocabulary and embedding fine-tuning. For example, in a provider domain (vocabulary), a search query "foot pain" in a provider search may generate a related search query for "podiatrist," where in a prescription domain, the same query in a prescription search may generate a related search query for pain medication or other drug prescriptions. As such, searches may be fine-tuned for various content types by manipulating vocabulary without feature engineering.

In accordance with various embodiments of the present disclosure, an information retrieval system provides semantic search capabilities of embeddings/vectorized search and the flexibility of keyword search by expanding search queries using a set of embeddings associated with a pre-determined set of vocabulary specific to a content set. As such, embodiments of the present disclosure provide an enhanced and hybrid search approach that addresses the challenges facing conventional embedding and keyword search. The techniques disclosed herewith comprise domain-aware query understanding that is customizable and search query expansion that is based on a set of vocabulary embeddings that may be modified to comply with a variety of customizable rules. In this manner, some of the techniques of the present disclosure, improve accuracy of performing predictive operations as needed on certain sets of data. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training predictive machine learning models. In further embodiments, an information retrieval system comprises or is communicatively coupled to a predictive data analysis computing entity comprising one or more predictive machine learning models that are configured to preprocess a search query via correct spelling, normalizing, and tokenizing to conform the search query with or resemble vocabulary and/or context from content items of the content set prior to search query expansion, thus improving the accuracy and performance of the information retrieval system. Other technical improvements and advantages may be realized by one of ordinary skill in the art.

V. Example System Operations

As indicated, various embodiments of the present disclosure make important technical contributions to improving predictive accuracy of predictive machine learning models used in generating responses to search queries by generating embeddings (from which similar embeddings are used to generate semantically related search queries) of an embeddings dictionary data object, where the embeddings are associated with a plurality of words, terms, or phrases associated with one or more domain vocabulary data objects. The one or more domain vocabulary data objects may be representative of a vocabulary associated with a content set and may be generated by extracting and/or analyzing text from content items of a content set and categorizing or labeling the content items based on the extracted/analyzed text in combination with search and browsing activities. The domain-aware sentence embedding machine learning model may comprise a pre-trained sentence transformer model that is fine-tuned based on embeddings of search query-content item pairs, generated from search query logs and click-through data, comprising a contrastive loss below a maximum contrastive loss threshold. This approach improves training speed and training efficiency of training predictive machine learning models. It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

Figure 4:
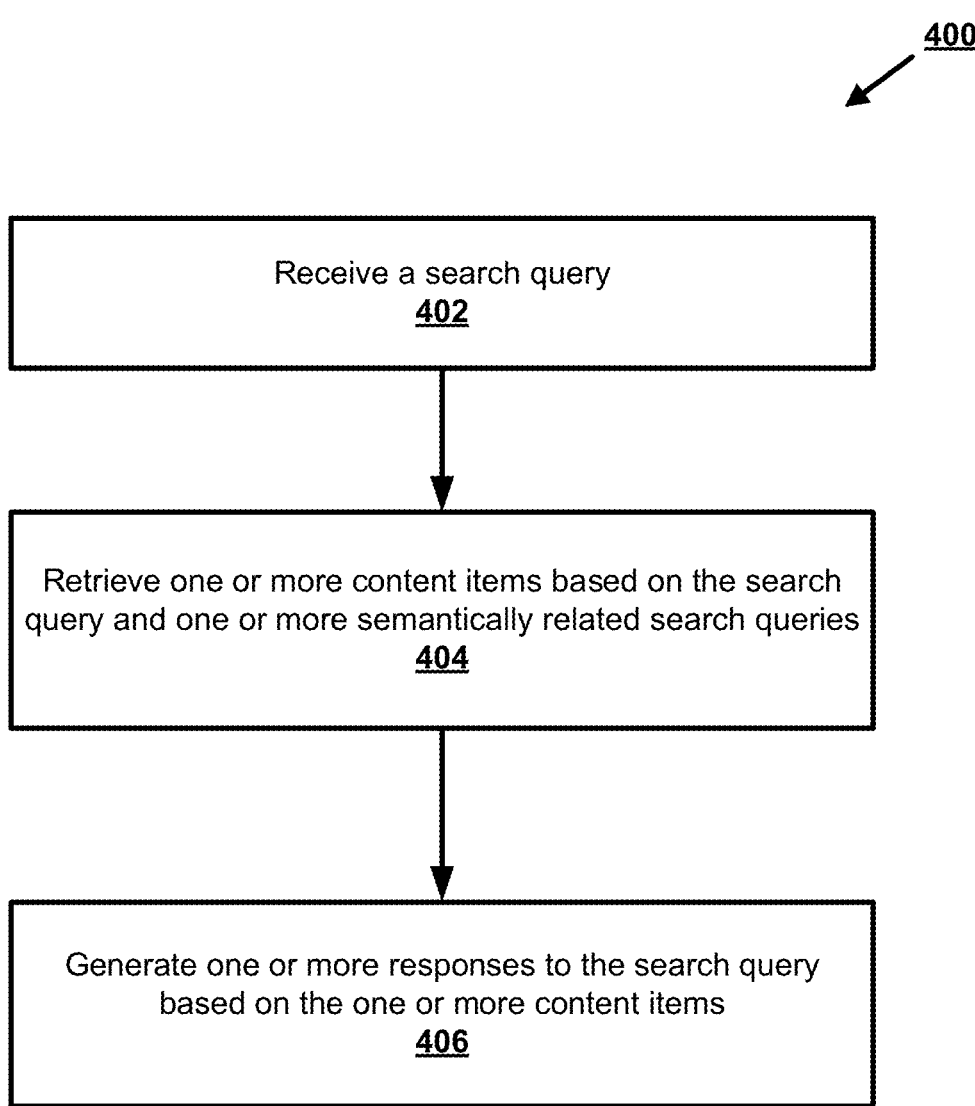
FIG. 4 is a flowchart diagram of an example process for processing search queries in accordance with some embodiments of the present disclosure.

FIG. 4 is a flowchart diagram of an example process for processing search queries in accordance with some embodiments of the present disclosure. In some embodiments, via the various steps/operations of the process 400, a user may provide a search query from a client computing entity 102 to predictive data analysis computing entity 106 either directly, or via an information retrieval system comprising a search engine, and in response to the search query, one or more responses to the search query may be generated and returned to the client computing entity 102, e.g., as search results for the search query.

In some embodiments, the process 400 begins at step/operation 402 when the predictive data analysis computing entity 106 receives a search query. In some embodiments, a search query describes a request for information. A search query may comprise one or more words. According to various embodiments of the present disclosure, search queries may be received by a predictive data analysis system from one or more client computing entities, either directly or indirectly via, e.g., an information retrieval system comprising a search engine. According to various embodiments of the present disclosure, a search query may be received by a predictive data analysis system from one or more client computing entities, either directly or indirectly via, e.g., an information retrieval system comprising a search engine. According to various embodiments of the present disclosure, search queries may be received by predictive data analysis system 101 and/or predictive data analysis computing entity 106 from one or more client computing entities 102, either directly or indirectly via, e.g., an information retrieval system comprising a search engine.

In some embodiments, at step/operation 404, the predictive data analysis computing entity 106 retrieves one or more content items based on the search query and one or more semantically related search queries. In some embodiments, a semantically related search query describes an alternative search query that has been determined to be semantically similar to the search query. According to various embodiments of the present disclosure, one or more semantically related search queries are generated for a search query based on one or more similar embeddings.

In some embodiments, a similar embedding describes an embedding that is determined to be similar to a query embedding associated with the search query. In some embodiments, a query embedding describes an embedding of a search query. In some embodiments, an embedding describes a latent representation of data comprising one or more features. For example, an embedding of data may be expressed as a vector comprising one or more numbers representative of one or more features associated with content of the data. In some embodiments, an embedding may be generated by mapping one or more features to one or more elements in a vector space. According to various embodiments of the present disclosure, an embedding comprises a feature associated with machine learning model input data. One or more embeddings may be generated for machine learning model input data such that the machine learning model input data may be provided in a format suitable for analysis or processing by a machine learning model. Generating semantically related search queries are described in further detail with respect to the description of FIG. 5.

In some embodiments, at step/operation 406, the predictive data analysis computing entity 106 generates one or more responses to the search query based on the one or more content items. The one or more responses may be transmitted to the client computing entity 102 from which the search query was received, e.g., as search results for the search query.

FIG. 5 is a flowchart diagram of an example process for generating semantically related search queries in accordance with some embodiments of the present disclosure. In some embodiments, via the various steps/operations of the process 500, the predictive data analysis computing entity 106 may use an embedding machine learning model framework to generate a query embedding for a processed search query and use the query embedding to generate one or more semantically related search queries.

In some embodiments, the process 500 begins at step/operation 502 when the predictive data analysis computing entity 106 generates a spell-corrected search query. In some embodiments, a spell-corrected search query describes a search query that has been corrected for spelling (errors) or conformed to a spelling convention. The spell-corrected search query may be generated by spell-correcting (e.g., via transforming or replacing) one or more words e.g., that are identified as being misspelled, of a search query based on one or more domain vocabulary data objects. According to various embodiments of the present disclosure, a spell-correct machine learning model comprising a neural edit distance machine learning model and a language machine learning model may be used to generate a spell-corrected search query.

In some embodiments, a word describes an element of a search query comprising a meaning and intent. Examples of a word may comprise a term, phrase, or string of characters, numbers, symbols, or any combination thereof.

In some embodiments, a domain vocabulary data object describes a vocabulary associated with a content set. A domain vocabulary data object may comprise one or more data entries representative of words comprising a vernacular of (or appear in) a content set. In some embodiments, a domain vocabulary data object may be generated by extracting and/or analyzing text from content items of a content set and categorizing or labeling the content items based on the extracted/analyzed text in combination with search and browsing activities. For example, a domain vocabulary data object of a website may be generated by web crawling one or more webpages of the website and analyzing a history of search query logs to extract a vocabulary, and context, that best represents a language of the webpages or website.

According to various embodiments of the present disclosure, one or more customizable rules may be applied to one or more data entries of a domain vocabulary data object. In some embodiments, a customizable rule comprises configuring certain data entries of a domain vocabulary data object such that specific topics of content are disassociated with one or more other topics of content. For example, "abortion" or other sensitive topics may be removed or excluded from words (used in queries) about pregnancy, such that a domain-aware sentence embedding machine may prevent relating a query (query embeddings) to sensitive topics (similar embeddings).

In some embodiments, the predictive data analysis computing entity 106 uses a spell-correct machine learning model to generate the spell-corrected search query. In some embodiments, a spell-correct machine learning model describes parameters, hyperparameters, and/or defined operations of a machine learning model that is configured to generate spell-corrected search queries by spell-correcting (e.g., via transforming or replacing) one or more words e.g., that are identified as being misspelled, of a search query or replacing the one or more words based on one or more domain vocabulary data objects. According to various embodiments of the present disclosure, a spell-correct machine learning model comprises a neural edit distance machine learning model and a language machine learning model.

FIG. 6 is a flowchart diagram of an example process for correcting spelling of words in search queries in accordance with some embodiments of the present disclosure. In some embodiments, via the various steps/operations of the process 600, the predictive data analysis computing entity 106 may use a spell-correct machine learning model to generate spell-corrected search queries.

In some embodiments, the process 600 begins at step/operation 602 when the predictive data analysis computing entity 106 generates, using a neural edit distance machine learning model, one or more correct word candidates for a search query.

In some embodiments, a neural edit distance machine learning model describes parameters, hyperparameters, and/or defined operations of a machine learning model that is configured to generate correct word candidates. A neural edit distance machine learning model may generate correct word candidates by transforming or replacing words, e.g., that are identified as being misspelled, of a search query to words associated with one or more domain vocabulary data objects based on minimum edit distance. Words of a search query may be identified by the neural edit distance machine learning model as incorrect words based on one or more domain vocabulary data objects. For example, a neural edit distance machine learning model may recursively modify one or more words e.g., that are identified as being misspelled, of a search query with a minimal edit distance to match one or more words associated with one or more domain vocabulary data objects and/or determine word candidates associated with the one or more domain vocabulary data objects comprising low edit distances with respect to the search query.

In some embodiments, a correct word candidate describes a prediction comprising a word determined to be a correct spelling of an incorrectly spelled word identified in a search query. One or more correct word candidates may be generated for one or more words e.g., that are identified as being misspelled, of a search query by a neural edit distance machine learning model. In some embodiments, a correct word candidate may be generated by transforming a word from a search query based on minimum edit distance with respect to one or more words associated with one or more domain vocabulary data objects. Accordingly, the one or more correct word candidates for the search query may be generated by modifying one or more words from the search query based on minimum edit distance between the one or more words of search query and one or more words associated with one or more domain vocabulary data objects. In some embodiments, modifying the one or more words may comprise determining one or more word candidates associated with the one or more domain vocabulary data objects comprising edit distances below an edit distance threshold.

In some embodiments, an edit distance describes a measurement of similarity between two words based on a minimum number of editing operations (e.g., insertion, deletion, substitution) needed to transform one of the two words into the other word.

In some embodiments, at step/operation 604, the predictive data analysis computing entity 106 generates, using a language machine learning model, feedback associated with respective ones of the one or more correct word candidates. The language machine learning model may generate feedback on the correct word candidates generated by the neural edit distance machine learning model. In some embodiments, the feedback comprises one or more probability scores associated with respective ones of the one or more correct word candidates. A probability score may comprise a probability of a correct word candidate being correct or appropriate within a context of a search query. A correct word candidate despite having a low edit distance to one or more words associated with one or more domain vocabulary data objects, may not necessarily be a best fit for a specific context of a search query. As an example, a probability score comprises a posterior probability associated with a context of a correct word candidate in view of one or more words proceeding a word in which the correct word candidate may replace within a search query. In some other embodiments, feedback generated by a language machine learning model comprises an identification of correct word candidates comprising highest probability scores that exceed a minimum probability threshold. As such, according to various embodiments of the present disclosure, a language machine learning model may be paired with a neural edit distance machine learning model in a spell-correct machine learning model to generate spell-corrected search queries based on correct word candidates with the highest probability of being correct based on context.

In some embodiments, a language machine learning model describes parameters, hyperparameters, and/or defined operations of a machine learning model that is configured to determine a probability of an entirety of a word sequence is valid or correct and provide feedback to a neural edit distance machine learning model on correct word candidates generated by the neural edit distance machine learning model. The feedback may be generated by the language machine learning model to indicate likelihood of correctness of the correct word candidates given a particular context (e.g., maximum posterior probability) based on a search query associated with the correct word candidates and a content set the language machine learning model is trained on. The correct word candidates identified with the highest probability scores may be provided to the neural edit distance machine learning model as feedback for generating relevant correct word candidates for a particular search query. In some embodiments, if none of the correct word candidates satisfy a minimum probability score threshold, the language machine learning model may generate a request or data output to signal the neural edit-distance machine learning model to generate further correct word candidates.

The language machine learning model may infer how probable a correct word candidate fits within a surrounding context in which the correct word candidate is placed in, e.g., a search query. The neural edit distance machine learning model may use the feedback generated by the language machine learning model to determine correct word candidates that are the most relevant or determine if further correct word candidates should be generated.

In some embodiments, a language machine learning model may (i) receive from a neural edit distance machine learning model, correct word candidates for one or more words of a search query, (ii) determine probability scores associated with respective ones of the correct word candidates, and (iii) identify correct word candidates comprising highest probability scores representative of a greatest likelihood of correctness given a particular context (e.g., maximum posterior probability) based on the search query and a content set the language machine learning model is trained on.

A language machine learning model may be trained based on a content set. In some embodiments, training a language machine learning model may further comprise using skip-gram to predict one or more context words for given target words based on a content set. In some embodiments, the language machine learning model comprises a bag-of-words machine learning model. According to various embodiments of the present disclosure, a language machine learning model may be used to guide a neural edit distance machine learning model in generating correct word candidates that are context relevant with respect to a content set search queries of which the correct word candidates are generated for.

In some embodiments, at step/operation 606, the predictive data analysis computing entity 106 selects one of the one or more correct word candidates based on the feedback. In some embodiments, selecting one of the one or more correct word candidates may comprise selecting a correct word candidate comprising the highest probability score from among the probability scores of the one or more correct word candidates, wherein the highest probability score satisfies a minimum probability score threshold.

In some embodiments, at step/operation 608, the predictive data analysis computing entity 106 generates a spell-corrected search query based on the selected one of the one or more correct word candidates.

Figure 7:
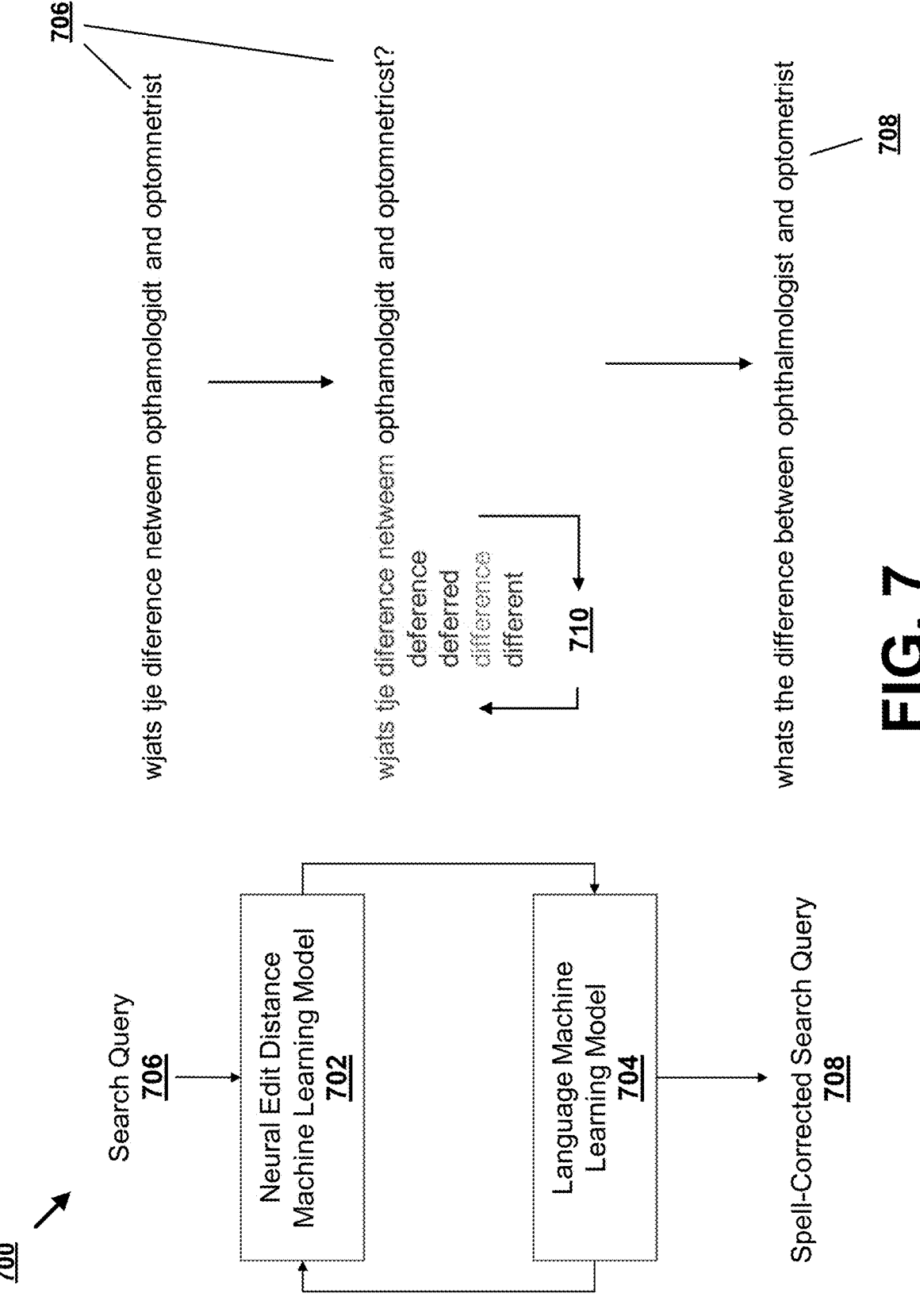
FIG. 7 depicts an operational example of a spell-correct machine learning model in accordance with some embodiments of the present disclosure.

FIG. 7 depicts an operational example of a spell-correct machine learning model 700 in accordance with some embodiments of the present disclosure. Spell-correct machine learning model 700 comprises a neural edit distance machine learning model 702 coupled to a language machine learning model 704. As depicted in FIG. 7, in some embodiments, the neural edit distance machine learning model 702 receives a search query 706, modifies one or more misspelled words of search query 706, and generates spell-corrected search query 708 based on the modified one or more misspelled words. The one or more misspelled words of search query 706 may be modified by neural edit distance machine learning model 702 based on minimum edit distance between the one or more misspelled words of search query 706 and one or more words associated with one or more domain vocabulary data objects. In some embodiments, modifying the one or more misspelled words may comprise determining word candidates associated with the one or more domain vocabulary data objects comprising edit distances below an edit distance threshold.

Moreover, as further depicted in FIG. 7, in some embodiments, the one or more misspelled words of search query 706 are modified based on feedback 710 generated by language machine learning model 704. The feedback 710 may comprise one or more probability scores associated with respective ones of the one or more correct word candidates and/or an identification of selected ones of the one or more correct word candidates comprising highest ones of the one or more probability scores. As such, language machine learning model 704 may be used to guide the neural edit distance machine learning model 702 by providing feedback 710 associated with most likely correct word candidates generated by the neural edit distance machine learning model to generate spell-corrected search query 708.

In some embodiments, the neural edit distance machine learning model comprises LSTM or a bidirectional GRU network. In some embodiments, a neural edit distance machine learning model may be trained to learn edit distance and order of letters with spell-check training data comprising incorrect words and associated correct word labels.

In some embodiments, spell-check training data describes a dataset that may be used to train a neural edit distance machine learning model. Spell-check training data may comprise incorrect words and associated correct word labels. According to various embodiments of the present disclosure, spell-check training data is generated based on a content set and one or more search query logs associated with the content set (e.g., such that a neural edit distance machine learning model may be trained with a domain-specific context).

Figure 8:
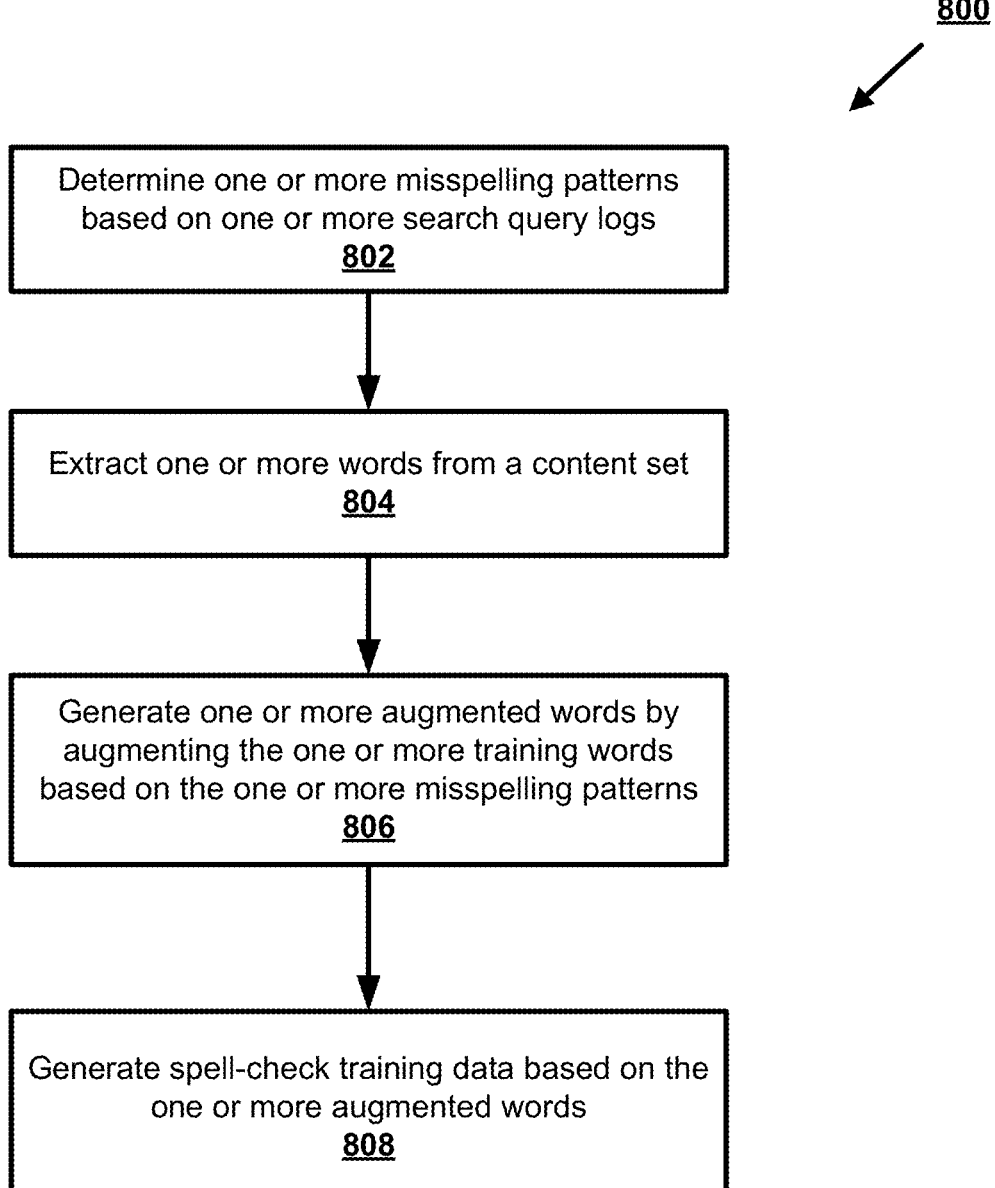
FIG. 8 is a flowchart diagram of an example process for generating spell-check training data in accordance with some embodiments of the present disclosure.

FIG. 8 is a flowchart diagram of an example process for generating spell-check training data in accordance with some embodiments of the present disclosure.

In some embodiments, the process 800 begins at step/operation 802 when the predictive data analysis computing entity 106 determines one or more misspelling patterns based on one or more search query logs. Search query logs may provide a good source of words and sentences that are misspelled incorrectly. The one or more search query logs may comprise a plurality of search queries received from a plurality of users by an information retrieval system. In some embodiments, the search query logs may be associated with content item retrievals from one or more particular content sets. In some embodiments, the one or more misspelling patterns comprise characteristics of misspellings identified from the one or more search query logs. Actual misspellings in the one or more search query logs, however, may be aggregated into a spell-check evaluation dataset (e.g., a testing dataset) used to validate a machine learning model, such as a neural edit distance machine learning model.

In some embodiments, at step/operation 804, the predictive data analysis computing entity 106 extracts one or more words from a content set. The content set may comprise a corpus of one or more content items associated with a domain of which spell-check training data is generated for. As such, the content set may provide a context for the spell-check training data used to train a neural edit distance machine learning model.

In some embodiments, at step/operation 806, the predictive data analysis computing entity 106 generates one or more augmented words by augmenting the one or more training words based on the one or more misspelling patterns. The misspelling patterns may be used to augment (e.g., modify) correctly spelled words found in the content set. In some embodiments, generating the one or more augmented words further comprises augmenting the one or more training words based on one or more nearest keys on a keyboard (e.g., accounting for keys close to each other that are commonly swapped).

In some embodiments, at step/operation 808, the predictive data analysis computing entity 106 generates spell-check training data based on the one or more augmented words. The one or more augmented words may comprise misspelling examples that may be used to train a neural edit distance machine learning model on how to correct them.

Returning to FIG. 5, in some embodiments, at step/operation 504, the predictive data analysis computing entity 106 generates a normalized search query by normalizing the spell-corrected search query to conform with the one or more domain vocabulary data objects. For example, the normalized search query may comprise the spell-corrected search query including one or more words that have been modified such that the spell-corrected search query is in a format that is closer to or consistent with words, associated with a domain vocabulary data object.

In some embodiments, normalizing describes a process of modifying data into a standard form. Data may be normalized such that multiple instances comprising a same data appear or exist in a consistent manner. For example, a search query may be normalized by modifying one or more words of the search query to conform with a domain vocabulary data object. According to various embodiments of the present disclosure, search queries are normalized to ensure that variations of a same word, term, or phrase are conformed to a common form based on one or more domain vocabulary data objects. For example, words such as "covid19" or "covid 19" are normalized to "covid_19."

In some embodiments, at step/operation 506, the predictive data analysis computing entity 106 generates a tokenized search query by tokenizing the normalized search query based on the one or more domain vocabulary data objects. In some embodiments, a tokenized search query describes a search query that has been converted into one or more tokens. The normalized search query may be tokenized such that one or more components of the normalized search query is optimized for relevancy or matching with a content set of which a search with the search query is performed on.

In some embodiments, tokenizing refers to an operation that extracts and converts one or more words, terms, phrases, characters, numbers, symbols, or any combination thereof, of a search query (e.g., the normalized search query) into one or more tokens. For example, a search query may be tokenized by mapping one or more components of the search query into one or more tokens based on an index of predefined keywords. According to various embodiments of the present disclosure, the normalized search query may be tokenized based on one or more domain vocabulary data objects such that each domain-specific keyword, term, or phrase within a search query may be identified and discretized into individual tokens.

In some embodiments, a token refers to a data construct that describes a representative unit comprising a sequence of one or more words, terms, phrases, characters, numbers, symbols, or any combination thereof. Tokens may be used to discretize one or more portions of a search query (e.g., the normalized query) into distinct concepts, features, or terminology.

In some embodiments, at step/operation 508, the predictive data analysis computing entity 106 generates a query embedding of the tokenized search query based on an embeddings dictionary data object associated with the one or more domain vocabulary data objects. The embeddings dictionary data object may be used to identify an embedding for each of one or more tokens comprising the tokenized search query.

In some embodiments, an embeddings dictionary data object describes an index of embeddings. An embeddings dictionary data object may comprise embeddings of one or more words associated with one or more domain vocabulary data objects. According to various embodiments of the present disclosure, a plurality of embeddings of the embeddings dictionary data object is generated using a domain-aware sentence embedding machine learning model based on the one or more domain vocabulary data objects.

In some embodiments, a domain-aware sentence embedding machine learning model describes parameters, hyper-parameters, and/or defined operations of a machine learning model that is configured to generate a plurality of embeddings of an embeddings dictionary data object for a plurality of words associated with one or more domain vocabulary data objects. According to various embodiments of the present disclosure, a domain-aware sentence embedding machine learning model may use the (embeddings of the) embeddings dictionary data object to generate a query embedding of a search query (e.g., that has been spell-corrected, normalized, and tokenized) and identify one or more similar embeddings from the embeddings dictionary data object based on a proximity of the one or more similar embeddings to the query embedding within a domain vector space.

In some embodiments, a domain-aware sentence embedding machine learning model comprises a pre-trained sentence transformer model that is further fine-tuned (e.g., on Bidirectional Encoder Representations from Transformers (BERT)) using next sentence prediction. In some embodiments, the domain-aware sentence embedding machine learning model is pre-trained by generating and/or initializing one or more pre-trained weights based on semantic pairs. The domain-aware sentence embedding machine learning model may be further fine-tuned by generating one or more fine-tuned weight. In some embodiments, one or more fine-tuned weights are generated for the domain-aware sentence embedding machine learning model by updating the one or more pre-trained weights based on predictions of next sentences of one or more training sentences associated with search queries from a search query log and a plurality of content items from a content set.

Next sentence prediction (NSP) may be used to fine-tune a domain-aware sentence embedding machine learning model to obtain a general understanding of a domain's (e.g., content set) language and vocabulary. To improve language understanding via use of NSP, a domain-aware sentence embedding machine learning model may be further fine-tuned with semantic pairs. In some embodiments, one or more fine-tuned weights are generated for the domain-aware sentence embedding machine learning model by further updating the one or more pre-trained weights based on contrastive loss between embeddings associated with semantic pairs. Semantic pairs may be generated by using search query logs, click-through data, and any relevant taxonomies (such as codes, e.g., International Classification of Diseases (ICD) and Current Procedural Terminology (CPT)) associated with a content set.

In some embodiments, a semantic pair describes a pair of sentences comprising a given amount of semantic similarity. According to various embodiments of the present disclosure, a domain-aware sentence embedding machine learning model may be fine-tuned based on one or more semantic pairs. In some embodiments, a semantic pair may comprise a search query-content item pair.

In some embodiments, a search query-content item pair describes a pairing that associates a search query with a content item. According to various embodiments of the present disclosure, one or more search query-content item pairs are generated based on one or more search query logs and click-through data. In particular, a search query-content item pair may be generated by determining an association of a search query in a search query log with a content item based on a selection or click (e.g., determined from the click-through data) of the content item when provided as a result for the search query. For example, a search query-content item pair may comprise a search query "backpain" and a content item "chiropractic" that a user providing the search query clicked when searching for "backpain."

FIG. 9 is a flowchart diagram of an example process for fine-tuning a domain-aware sentence embedding machine learning model in accordance with some embodiments of the present disclosure.

In some embodiments, the process 900 begins at step/operation 902 when the predictive data analysis computing entity 106 generates one or more search query-content item pairs based on one or more search query logs and click-through data.

In some embodiments, at step/operation 904, the predictive data analysis computing entity 106 generates one or more training query embeddings and one or more training content item embeddings associated with the one or more search query-content item pairs.

In some embodiments, a content item embedding describes an embedding of a content item. According to various embodiments of the present disclosure, a content item embedding associated with a search query-content item pair may be generated to determine a contrastive loss value between an embedding of a query associated with the search query-content item pair and the content item embedding.

In some embodiments, at step/operation 906, the predictive data analysis computing entity 106 generates one or more contrastive loss values between the one or more training query embeddings and the one or more training content item embeddings.

In some embodiments, at step/operation 908, the predictive data analysis computing entity 106 identifies any of the one or more search query-content item pairs comprising a contrastive loss value below a maximum contrastive loss threshold.

Figure 10:
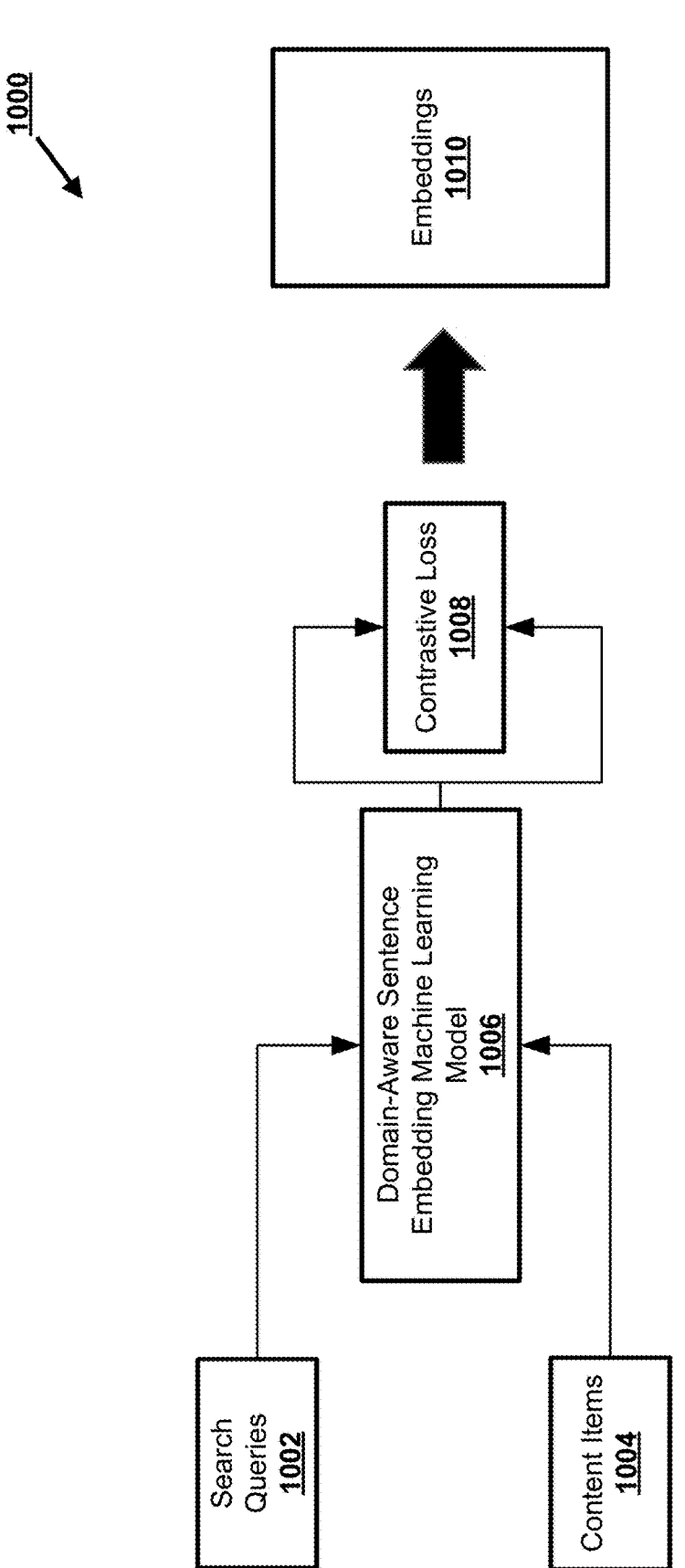
FIG. 10 depicts an operational example of a domain-aware sentence embedding machine learning model.

FIG. 10 depicts an operational example of a domain-aware sentence embedding machine learning model 1000. Semantic pairs comprising search query-content item pairs may be generated from search queries 1002 and content items 1004. Domain-aware sentence embedding machine learning model 1006 may be fine-tuned on semantic pairs comprising minimal contrastive loss 1008 values. As such, embeddings 1010 (e.g., embeddings dictionary data object) may be generated by the domain-aware sentence embedding machine learning model 1006 based on minimizing a contrastive loss of semantic pairs comprising search queries 1002 and content items 1004 representing of similarity between embeddings of semantic pairs and in turn, similarity of the semantic pairs (pairing of a search query with a content item) themselves.

Returning to FIG. 5, in some embodiments, at step/operation 510, the predictive data analysis computing entity 106 identifies one or more similar embeddings from the embeddings dictionary data object based on a proximity of the one or more similar embeddings to the query embedding within a domain vector space. In some embodiments, the proximity may be determined using a nearest neighbor search or any other distance metric-based search to find embeddings that are semantically similar in the domain vector space. Identifying one or more similar embeddings may comprise identifying the one or more similar embeddings as being semantically similar to a query embedding. In some embodiments, identifying one or more similar embeddings (for a query embedding) may comprise determining one or more clusters comprising the one or more similar embeddings and the query embedding. In some embodiments, one or more similar embeddings are determined based on a nearest neighbor search in a domain vector space with respect to a query embedding.

In some embodiments, a cluster describes a grouping of data, such as embeddings, within a domain vector space based on one or more characteristics or features of the data. In some embodiments, one or more clusters of embeddings from an embeddings dictionary data object may be generated to categorize and identify similar embeddings.

In some embodiments, a domain vector space describes a representation of a domain comprising one or more dimensions representative of features associated with the domain. One or more vectors comprising embeddings may be mapped to respective one or more coordinates or locations associated with one or more dimensions of a domain vectors space based on features associated with the embeddings. According to various embodiments of the present disclosure, a domain vector space may be used to model one or more domain vocabulary data objects associated with a content set.

In some embodiments, at step/operation 512, the predictive data analysis computing entity 106 generates one or more semantically related search queries for the search query based on the one or more similar embeddings.

Accordingly, as described above, various embodiments of the present disclosure make important technical contributions to improving predictive accuracy of predictive machine learning models used in generating responses to search queries by generating embeddings (from which similar embeddings are used to generate semantically related search queries) of an embeddings dictionary data object, where the embeddings are associated with a plurality of words, terms, or phrases associated with one or more domain vocabulary data objects. The one or more domain vocabulary data objects may be representative of a vocabulary associated with a content set and may be generated by extracting and/or analyzing text from content items of a content set and categorizing or labeling the content items based on the extracted/analyzed text in combination with search and browsing activities. The domain-aware sentence embedding machine learning model may comprise a pre-trained sentence transformer model that is fine-tuned based on embeddings of search query-content item pairs, generated from search query logs and click-through data, comprising a contrastive loss below a maximum contrastive loss threshold. This approach improves training speed and training efficiency of training predictive machine learning models. It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

Some techniques of the present disclosure enable the generation of queries that are semantically related to a user-provided search query and may be used to generate responses to the user-provided search query. The techniques of the present disclosure may be used, applied, and/or otherwise leveraged to generate a domain-aware sentence embedding machine learning model, which may help in the computer interpretation relevancy between search queries and content items via the generation of an embeddings dictionary data object. The domain-aware sentence embedding machine learning model of the present disclosure may be leveraged to generate responses to search queries that improve the performance of a computing system (e.g., a computer itself, etc.) with respect to various predictive actions performed by the predictive data analysis computing entity 106, such as for the matching of search queries to content items that are contextually relevant according to a domain of the content items.

In some examples, the responses to search queries may include predictive actions that may be based on a prediction domain. A prediction domain may include any environment in which computing systems may be applied to achieve real-word insights, such as predictions (e.g., abstractive summaries, predictive intents, etc.), and initiate the performance of computing tasks, such as predictive actions e.g., updating user preferences, providing account information, cancelling an account, adding an account, etc.) to act on the real-world insights. These predictive actions may cause real-world changes, for example, by controlling a hardware component, providing alerts, interactive actions, and/or the like.

Examples of prediction domains may include financial systems, clinical systems, autonomous systems, robotic systems, and/or the like. Predictive actions in such domains may include the initiation of automated instructions across and between devices, automated notifications, automated scheduling operations, automated precautionary actions, automated security actions, automated data processing actions, automated data compliance actions, automated data access enforcement actions, automated adjustments to computing and/or human data access management, and/or the like.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method comprising: generating, by one or more processors, a spell-corrected search query by transforming one or more query words from a search query based on one or more domain vocabulary data objects; generating, by the one or more processors, a normalized search query by normalizing the spell-corrected search query to conform with the one or more domain vocabulary data objects; generating, by the one or more processors, a tokenized search query by tokenizing the normalized search query based on the one or more domain vocabulary data objects; generating, by the one or more processors, a query embedding of the tokenized search query based on an embeddings dictionary data object associated with the one or more domain vocabulary data objects; identifying, by the one or more processors, one or more similar embeddings from the embeddings dictionary data object based on a proximity of the one or more similar embeddings to the query embedding within a domain vector space; generating, by the one or more processors, one or more semantically related search queries for the search query based on the one or more similar embeddings; retrieving, by the one or more processors, one or more content items based on the one or more semantically related search queries; and generating, by the one or more processors, one or more responses to the search query based on the one or more content items.

Example 2. The computer-implemented method of any of the preceding examples further comprising generating spell-check training data based on a content set and one or more search query logs associated with the content set.

Example 3. The computer-implemented method of any of the preceding examples, wherein generating the spell-check training data further comprises: determining one or more misspelling patterns based on the one or more search query logs; extracting one or more training words from the content set; generating one or more augmented words by augmenting the one or more training words based on the one or more misspelling patterns; and generating the spell-check training data based on the one or more augmented words.

Example 4. The computer-implemented method of any of the preceding examples, wherein the spell-corrected search query is generated using a spell-correct machine learning model comprising a neural edit distance machine learning model and a language machine learning model.

Example 5. The computer-implemented method of any of the preceding examples, wherein generating the spell-corrected search query further comprises: generating, using the neural edit distance machine learning model, one or more correct word candidates for the search query; generating, using the language machine learning model, feedback associated with respective ones of the one or more correct word candidates; selecting one of the one or more correct word candidates based on the feedback; and generating the spell-corrected search query based on the selected one of the one or more correct word candidates.

Example 6. The computer-implemented method of any of the preceding examples further comprising generating, using a domain-aware sentence embedding machine learning model, a plurality of embeddings of the embeddings dictionary data object for a plurality of words, terms, or phrases associated with the one or more domain vocabulary data objects.

Example 7. The computer-implemented method of any of the preceding examples further comprising generating one or more fine-tuned weights for the domain-aware sentence embedding machine learning model by predicting a next sentence of one or more training sentences associated with a plurality of content items from a content set.

Example 8. The computer-implemented method of any of the preceding examples further comprising generating one or more fine-tuned weights for the domain-aware sentence embedding machine learning model by: generating one or more search query-content item pairs based on one or more search query logs and click-through data; generating one or more training query embeddings and one or more training content item embeddings associated with respective ones of the one or more search query-content item pairs; generating one or more contrastive loss values between the one or more training query embeddings and the one or more training content item embeddings; and identifying any of the one or more search query-content item pairs comprising a contrastive loss value below a maximum contrastive loss threshold.

Example 9. The computer-implemented method of any of the preceding examples wherein identifying the one or more similar embeddings further comprises identifying the one or more similar embeddings based on one or more clusters comprising the one or more similar embeddings and the query embedding.

Example 10. The computer-implemented method of any of the preceding examples wherein identifying the one or more similar embeddings comprises identifying the one or more similar embeddings as being semantically similar to the query embedding based on a nearest neighbor search in a domain vector space.

Example 11. A computing system comprising memory and one or more processors communicatively coupled to the memory, the one or more processors configured to: generate a spell-corrected search query by transforming one or more query words from a search query based on one or more domain vocabulary data objects; generate a normalized search query by normalizing the spell-corrected search query to conform with the one or more domain vocabulary data objects; generate a tokenized search query by tokenizing the normalized search query based on the one or more domain vocabulary data objects; generate a query embedding of the tokenized search query based on an embeddings dictionary data object associated with the one or more domain vocabulary data objects; identify one or more similar embeddings from the embeddings dictionary data object based on a proximity of the one or more similar embeddings to the query embedding within a domain vector space; generate one or more semantically related search queries for the search query based on the one or more similar embeddings; retrieve one or more content items based on the one or more semantically related search queries; and generate one or more responses to the search query based on the one or more content items.

Example 12. The computing system of any of the preceding examples, wherein the one or more processors are further configured to generate spell-check training data based on a content set and one or more search query logs associated with the content set.

Example 13. The computing system of any of the preceding examples, wherein the one or more processors are further configured to: determine one or more misspelling patterns based on the one or more search query logs; extract one or more training words from the content set; generate one or more augmented words by augmenting the one or more training words based on the one or more misspelling patterns; and generate the spell-check training data based on the one or more augmented words.

Example 14. The computing system of any of the preceding examples, wherein the one or more processors are further configured to generate the spell-corrected search query using a spell-correct machine learning model comprising a neural edit distance machine learning model and a language machine learning model.

Example 15. The computing system of any of the preceding examples, wherein the one or more processors are further configured to generate, using the neural edit distance machine learning model, one or more correct word candidates for the search query; generate, using the language machine learning model, feedback associated with respective ones of the one or more correct word candidates; select one of the one or more correct word candidates based on the feedback; and generate the spell-corrected search query based on the selected one of the one or more correct word candidates.

Example 16. The computing system of any of the preceding examples, wherein the one or more processors are further configured to generate, using a domain-aware sentence embedding machine learning model, a plurality of embeddings of the embeddings dictionary data object for a plurality of words, terms, or phrases associated with the one or more domain vocabulary data objects.

Example 17. The computing system of any of the preceding examples, wherein the one or more processors are further configured to generate one or more fine-tuned weights for the domain-aware sentence embedding machine learning model by predicting a next sentence of one or more training sentences associated with a plurality of content items from a content set.

Example 18. The computing system of any of the preceding examples, wherein the one or more processors are further configured to generate one or more fine-tuned weights for the domain-aware sentence embedding machine learning model by: generating one or more search query-content item pairs based on one or more search query logs and click-through data; generating one or more training query embeddings and one or more training content item embeddings associated with respective ones of the one or more search query-content item pairs; generating one or more contrastive loss values between the one or more training query embeddings and the one or more training content item embeddings; and identifying any of the one or more search query-content item pairs comprising a contrastive loss value below a maximum contrastive loss threshold.

Example 19. The computing system of any of the preceding examples, wherein the one or more processors are further configured to identify the one or more similar embeddings based on one or more clusters comprising the one or more similar embeddings and the query embedding.

Example 20. The computing system of any of the preceding examples, wherein the one or more processors are further configured to identify the one or more similar embeddings as being semantically similar to the query embedding based on a nearest neighbor search in a domain vector space.

Example 21. One or more non-transitory computer-readable storage media including instructions that, when executed by one or more processors, cause the one or more processors to: generate a spell-corrected search query by transforming one or more query words from a search query based on one or more domain vocabulary data objects; generate a normalized search query by normalizing the spell-corrected search query to conform with the one or more domain vocabulary data objects; generate a tokenized search query by tokenizing the normalized search query based on the one or more domain vocabulary data objects; generate a query embedding of the tokenized search query based on an embeddings dictionary data object associated with the one or more domain vocabulary data objects; identify one or more similar embeddings from the embeddings dictionary data object based on a proximity of the one or more similar embeddings to the query embedding within a domain vector space; generate one or more semantically related search queries for the search query based on the one or more similar embeddings; retrieve one or more content items based on the one or more semantically related search queries; and generate one or more responses to the search query based on the one or more content items.

Example 22. The one or more non-transitory computer-readable storage media of any of the preceding examples, further including instructions that, when executed by the one or more processors, cause the one or more processors to generate spell-check training data based on a content set and one or more search query logs associated with the content set.

Example 23. The one or more non-transitory computer-readable storage media of any of the preceding examples, further including instructions that, when executed by the one or more processors, cause the one or more processors to: determine one or more misspelling patterns based on the one or more search query logs; extract one or more training words from the content set; generate one or more augmented words by augmenting the one or more training words based on the one or more misspelling patterns; and generate the spell-check training data based on the one or more augmented words.

Example 24. The one or more non-transitory computer-readable storage media of any of the preceding examples, further including instructions that, when executed by the one or more processors, cause the one or more processors to generate the spell-corrected search query using a spell-correct machine learning model comprising a neural edit distance machine learning model and a language machine learning model.

Example 25. The one or more non-transitory computer-readable storage media of any of the preceding examples, further including instructions that, when executed by the one or more processors, cause the one or more processors to: generate, using the neural edit distance machine learning model, one or more correct word candidates for the search query; generate, using the language machine learning model, feedback associated with respective ones of the one or more correct word candidates; select one of the one or more correct word candidates based on the feedback; and generate the spell-corrected search query based on the selected one of the one or more correct word candidates.

Example 26. The one or more non-transitory computer-readable storage media of any of the preceding examples, further including instructions that, when executed by the one or more processors, cause the one or more processors to generate, using a domain-aware sentence embedding machine learning model, a plurality of embeddings of the embeddings dictionary data object for a plurality of words, terms, or phrases associated with the one or more domain vocabulary data objects.

Example 27. The one or more non-transitory computer-readable storage media of any of the preceding examples, further including instructions that, when executed by the one or more processors, cause the one or more processors to generate one or more fine-tuned weights for the domain-aware sentence embedding machine learning model by predicting a next sentence of one or more training sentences associated with a plurality of content items from a content set.

Example 28. The one or more non-transitory computer-readable storage media of any of the preceding examples, further including instructions that, when executed by the one or more processors, cause the one or more processors to generate one or more fine-tuned weights for the domain-aware sentence embedding machine learning model by: generating one or more search query-content item pairs based on one or more search query logs and click-through data; generating one or more training query embeddings and one or more training content item embeddings associated with respective ones of the one or more search query-content item pairs; generating one or more contrastive loss values between the one or more training query embeddings and the one or more training content item embeddings; and identifying any of the one or more search query-content item pairs comprising a contrastive loss value below a maximum contrastive loss threshold.

Example 29. The one or more non-transitory computer-readable storage media of any of the preceding examples, further including instructions that, when executed by the one or more processors, cause the one or more processors to identify the one or more similar embeddings based on one or more clusters comprising the one or more similar embeddings and the query embedding.

Example 30. The one or more non-transitory computer-readable storage media of any of the preceding examples, further including instructions that, when executed by the one or more processors, cause the one or more processors to identify the one or more similar embeddings as being semantically similar to the query embedding based on a nearest neighbor search in a domain vector space.

The invention claimed is:

1. A computer-implemented method comprising:

generating, by one or more processors, a spell-corrected search query by transforming, via one or more editing operations and according to an edit distance threshold, one or more query words from a search query to one or more domain vocabulary words that correspond to a set of one or more data entries of a domain vocabulary data object, wherein:

(i) the domain vocabulary data object is generated by:

(a) analyzing a history of search query logs corresponding to one or more webpages of a website, and (b) extracting a vocabulary and context that represents a language of the one or more webpages or the website, and (ii) a customizable rule is applied to the set of one or more data entries that modifies one or more associations of topics to the set of one or more data entries;

generating, by the one or more processors, a normalized search query by normalizing the spell-corrected search query to conform with the domain vocabulary data object;

generating, by the one or more processors, a tokenized search query by tokenizing the normalized search query based on the domain vocabulary data object, wherein:

(i) tokenizing the normalized search query comprises mapping a component of the normalized search query into a token based on an index of a plurality of words, and (ii) one or more words of the plurality of words correspond to the domain vocabulary data object;

generating, by the one or more processors, a query embedding of the tokenized search query based on the customizable rule and an embeddings dictionary data object associated with the domain vocabulary data object, wherein (i) the embeddings dictionary data object comprises an index of a plurality of embeddings and (ii) the plurality of embeddings comprises one or more embeddings of the one or more words that correspond to the domain vocabulary data object;

identifying, by the one or more processors, one or more similar embeddings from the embeddings dictionary data object based on a proximity of the one or more similar embeddings to the query embedding;

generating, by the one or more processors, one or more semantically related search queries for the search query based on the one or more similar embeddings;

retrieving, by the one or more processors, one or more content items based on the one or more semantically related search queries; and generating, by the one or more processors, one or more responses to the search query based on the one or more content items.

2. The computer-implemented method of claim 1 further comprising generating spell-check training data based on a content set and one or more search query logs associated with the content set.

3. The computer-implemented method of claim 2, wherein generating the spell-check training data further comprises:

determining one or more misspelling patterns based on the one or more search query logs;

extracting one or more training words from the content set;

generating one or more augmented words by augmenting the one or more training words based on the one or more misspelling patterns; and generating the spell-check training data based on the one or more augmented words.

4. The computer-implemented method of claim 1, wherein the spell-corrected search query is generated using a spell-correct machine learning model comprising a neural edit distance machine learning model and a language machine learning model.

5. The computer-implemented method of claim 4, wherein generating the spell-corrected search query further comprises:

generating, using the neural edit distance machine learning model, one or more correct word candidates for the search query;

generating, using the language machine learning model, feedback associated with respective ones of the one or more correct word candidates;

selecting one of the one or more correct word candidates based on the feedback; and generating the spell-corrected search query based on a selection of the one or more correct word candidates.

6. The computer-implemented method of claim 1 further comprising generating, using a domain-aware sentence embedding machine learning model, a plurality of dictionary data embeddings of the embeddings dictionary data object for a plurality of domain words, terms, or phrases associated with the domain vocabulary data object.

7. The computer-implemented method of claim 6 further comprising generating one or more fine-tuned weights for the domain-aware sentence embedding machine learning model by predicting a next sentence of one or more training sentences associated with a plurality of content items from a content set.

8. The computer-implemented method of claim 6 further comprising generating one or more fine-tuned weights for the domain-aware sentence embedding machine learning model by:

generating one or more search query-content item pairs based on one or more search query logs and click-through data;

generating one or more training query embeddings and one or more training content item embeddings associated with respective ones of the one or more search query-content item pairs;

generating one or more contrastive loss values between the one or more training query embeddings and the one or more training content item embeddings; and identifying any of the one or more search query-content item pairs comprising a contrastive loss value below a maximum contrastive loss threshold.

9. The computer-implemented method of claim 1, wherein identifying the one or more similar embeddings further comprises identifying the one or more similar embeddings based on one or more clusters comprising the one or more similar embeddings and the query embedding.

10. The computer-implemented method of claim 1, wherein identifying the one or more similar embeddings further comprises identifying the one or more similar embeddings as being semantically similar to the query embedding based on a nearest neighbor search in a domain vector space.

11. A system comprising one or more processors and one or more non-transitory computer readable media storing processor-executable instructions that, when executed by the one or more processors, cause the one or more processors to perform operations comprising:

generating a spell-corrected search query by transforming, via one or more editing operations and according to an edit distance threshold, one or more query words from a search query to one or more domain vocabulary words that correspond to a set of one or more data entries of a domain vocabulary data object, wherein:

(i) the domain vocabulary data object is generated by:

(a) analyzing a history of search query logs corresponding to one or more webpages of a website, and (b) extracting a vocabulary and context that represents a language of the one or more webpages or the website, and (ii) a customizable rule is applied to the set of one or more data entries that modifies one or more associations of topics to the set of one or more data entries;

generating a normalized search query by normalizing the spell-corrected search query to conform with the domain vocabulary data object;

generating a tokenized search query by tokenizing the normalized search query based on the domain vocabulary data object, wherein:

(i) tokenizing the normalized search query comprises mapping a component of the normalized search query into a token based on an index of a plurality of words, and (ii) one or more words of the plurality of words correspond to the domain vocabulary data object;

generating a query embedding of the tokenized search query based on the customizable rule and an embeddings dictionary data object associated with the domain vocabulary data object, wherein (i) the embeddings dictionary data object comprises an index of a plurality of embeddings and (ii) the plurality of embeddings comprises one or more embeddings of the one or more words that correspond to the domain vocabulary data object;

determining one or more similar embeddings from the embeddings dictionary data object based on proximity of the one or more similar embeddings to the query embedding within a domain vector space;

generating one or more semantically related search queries for the search query based on the one or more similar embeddings;

retrieving one or more content items based on the one or more semantically related search queries; and generating one or more responses to the search query based on the one or more content items.

12. The system of claim 11, wherein the operations further comprise generating spell-check training data based on a content set and one or more search query logs associated with the content set.

13. The system of claim 12, wherein the operations further comprise:

determining one or more misspelling patterns based on the one or more search query logs;

extracting one or more training words from the content set;

generating one or more augmented words by augmenting the one or more training words based on the one or more misspelling patterns; and generating the spell-check training data based on the one or more augmented words.

14. The system of claim 11, wherein the operations further comprise generating the spell-corrected search query using a spell-correct machine learning model comprising a neural edit distance machine learning model and a language machine learning model.

15. The system of claim 14, wherein the operations further comprise:

generating, using the neural edit distance machine learning model, one or more correct word candidates for the search query;

generating, using the language machine learning model, feedback associated with respective ones of the one or more correct word candidates;

selecting one of the one or more correct word candidates based on the feedback; and generating the spell-corrected search query based on a selection of the one or more correct word candidates.

16. The system of claim 11, wherein the operations further comprise generating, using a domain-aware sentence embedding machine learning model, a plurality of dictionary data embeddings of the embeddings dictionary data object for a plurality of domain words, terms, or phrases associated with the domain vocabulary data object.

17. The system of claim 16, wherein the operations further comprise generating one or more fine-tuned weights for the domain-aware sentence embedding machine learning model by:

generating one or more search query-content item pairs based on one or more search query logs and click-through data;

generating one or more training query embeddings and one or more training content item embeddings associated with respective ones of the one or more search query-content item pairs;

generating one or more contrastive loss values between the one or more training query embeddings and the one or more training content item embeddings; and identifying any of the one or more search query-content item pairs comprising a contrastive loss value below a maximum contrastive loss threshold.

18. One or more non-transitory computer-readable storage media storing instructions that, when executed by one or more processors, cause the one or more processors to perform operations comprising:

generating a spell-corrected search query by transforming, via one or more editing operations and according to an edit distance threshold, one or more query words from a search query to one or more domain vocabulary words that correspond to a set of one or more data entries of a domain vocabulary data object, wherein:

(i) the domain vocabulary data object is generated by:

(a) analyzing a history of search query logs corresponding to one or more webpages of a website, and (b) extracting a vocabulary and context that represents a language of the one or more webpages or the website, and (ii) a customizable rule is applied to the set of one or more data entries that modifies one or more associations of topics to the set of one or more data entries;

generating a normalized search query by normalizing the spell-corrected search query to conform with the domain vocabulary data object;

generating a tokenized search query by tokenizing the normalized search query based on the domain vocabulary data object, wherein:

(i) tokenizing the normalized search query comprises mapping a component of the normalized search query into a token based on an index of a plurality of words, and (ii) one or more words of the plurality of words correspond to the domain vocabulary data object;

generating a query embedding of the tokenized search query based on the customizable rule and an embeddings dictionary data object associated with the domain vocabulary data object, wherein (i) the embeddings dictionary data object comprises an index of a plurality of embeddings and (ii) the plurality of embeddings comprises one or more embeddings of the one or more words that correspond to the domain vocabulary data object;

determining one or more similar embeddings from the embeddings dictionary data object based on proximity of the one or more similar embeddings to the query embedding within a domain vector space;

generating one or more semantically related search queries for the search query based on the one or more similar embeddings;

retrieving one or more content items based on the one or more semantically related search queries; and generating one or more responses to the search query based on the one or more content items.

19. The one or more non-transitory computer-readable storage media of claim 18, wherein the operations further comprise generating, using a domain-aware sentence embedding machine learning model, a plurality of dictionary data embeddings of the embeddings dictionary data object for a plurality of domain words, terms, or phrases associated with the domain vocabulary data object.

20. The one or more non-transitory computer-readable storage media of claim 19, wherein the operations further comprise generating one or more fine-tuned weights for the domain-aware sentence embedding machine learning model by:

generating one or more search query-content item pairs based on one or more search query logs and click-through data;

generating one or more training query embeddings and one or more training content item embeddings associated with respective ones of the one or more search query-content item pairs;

generating one or more contrastive loss values between the one or more training query embeddings and the one or more training content item embeddings; and identifying any of the one or more search query-content item pairs comprising a contrastive loss value below a maximum contrastive loss threshold.

\* \* \* \* \*